US012784068B2

(12) United States Patent
Moghaddam et al.

(10) Patent No.: US 12,784,068 B2
(45) Date of Patent: Nov. 3, 2026

(54) MULTI-MODAL DATA-DRIVEN DESIGN CONCEPT EVALUATOR

(71) Applicant: Northeastern University, Boston, MA (US)

(72) Inventors: Mohsen Moghaddam, Boston, MA (US); Tucker J. Marion, Holliston, MA (US); Chenxi Yuan, Springfield, PA (US); Yi Han, Springfield, PA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 18/726,669

(22) PCT Filed: Jan. 4, 2023

(86) PCT No.: PCT/US2023/010122

§ 371 (c)(1),
(2) Date: Jul. 3, 2024

(87) PCT Pub. No.: WO2023/133144

PCT Pub. Date: Jul. 13, 2023

(65) Prior Publication Data

US 2025/0095008 A1 Mar. 20, 2025

Related U.S. Application Data

(60) Provisional application No. 63/310,794, filed on Feb. 16, 2022, provisional application No. 63/296,651, filed on Jan. 5, 2022.

(51) Int. Cl.
*G06Q 10/06* (2023.01)
*G06Q 30/0202* (2023.01)
(Continued)

(52) U.S. Cl.
CPC ..... *G06Q 30/0202* (2013.01); *G06Q 30/0203* (2013.01); *G06Q 30/0282* (2013.01)

(58) Field of Classification Search
None
See application file for complete search history.

(56) References Cited

U.S. PATENT DOCUMENTS

2016/0300135 A1 10/2016 Moudy et al.
2017/0061454 A1* 3/2017 Bao .................... G06Q 30/0203
(Continued)

FOREIGN PATENT DOCUMENTS

CN 112819510 A * 5/2021 ........... G06F 18/241
WO WO-2023/133144 A1 7/2023

OTHER PUBLICATIONS

Huang, F., Zhang, X., Zhao, Z., Xu, J. and Li, Z., 2019. Image-text sentiment analysis via deep multimodal attentive fusion. Knowledge-Based Systems, 167, pp. 26-37 (Year: 2019).*
(Continued)

*Primary Examiner* — Hamzeh Obaid
*Assistant Examiner* — Marjorie Pujols-Cruz
(74) *Attorney, Agent, or Firm* — Foley Hoag LLP; Dana M. Gordon; Erik A. Huestis

(57) ABSTRACT

A computer-implemented method for predicting customer sentiment for a product is provided. Customer data is received for multiple products and a vector of customer sentiments is generated that is associated with different aspects of the products. Images are received for multiple products and a latent vector for the images are generated using a pre-trained image processing model. Textual description for products is received and a latent vector for the textual description is generated using a pre-trained natural language processing model. A deep multimodal design evaluation (DMDE) model is designed to integrate
(Continued)

the latent vectors of the images and the textual descriptions to predict customer sentiment for new product designs based on their images and textual descriptions. A new product design is provided to the trained DMDE model to obtain predicted customer sentiments for one or more attributes or a new product design is generated with favorable predicted customer sentiments.

20 Claims, 14 Drawing Sheets

(51) Int. Cl.

*G06Q 30/0203* (2023.01)

*G06Q 30/0282* (2023.01)

(56) References Cited

U.S. PATENT DOCUMENTS

| | | | | |
|---|---|---|---|---|
| 2017/0116177 | A1 | 4/2017 | Walia | |
| 2019/0139058 | A1* | 5/2019 | Clark | G06Q 30/0201 |
| 2020/0036810 | A1 | 1/2020 | Howard | |
| 2020/0372193 | A1* | 11/2020 | Song | G06Q 30/0621 |
| 2021/0216862 | A1 | 7/2021 | Liu et al. | |
| 2022/0092652 | A1* | 3/2022 | Lu | G06T 11/60 |

OTHER PUBLICATIONS

Desai, Y., Shah, N., Shah, V., Bhavathankar, P. and Katchi, K., Sep. 2021. Markerless augmented reality based application for e-commerce to visualise 3D content. In 2021 Third International Conference on Inventive Research in Computing Applications (ICIRCA) (pp. 756-760). IEEE (Year: 2021).*

Supplementary European Search Report for EP Application No. 23737551.4 dated Jul. 29, 2025.

Yuan et al., “Attribute-aware generative design with generative adversarial networks.” IEEE Access 8 (2020): 190710-190721.

Yuan et al., “Leveraging end-user data for enhanced design concept evaluation: A multimodal deep regression model.” Journal of Mechanical Design 144(2) (2022): 021403.

Zhang et al., “Multimodal intelligence: Representation learning, information fusion, and applications.” IEEE Journal of Selected Topics in Signal Processing 14(3) (2020): 478-493.

International Search Report and Written Opinion for International Application No. PCT/US23/10122 dated Apr. 5, 2023.

* cited by examiner

Product Features
- Mid-cut silhouette for ankle protection and a classic look
- Breathable knit upper with overlays for stability
- Lace-up construction with padded collar and tongue
- Cushiony Lightstrike midsole for comfort
- Durable rubber traction outsole
- The adidas D Rose 11 is imported.

Table 1 Example of extracted attribute-level sentiment polarity and intensity from user reviews on a footwear product

| Attributes | Sentiment value |
|---|---|
| Traction | −0.051 |
| Shape | 0.376 |
| Heel | 0.479 |
| Cushion | 0.449 |
| Color | 0.188 |
| Fit | 0.227 |
| Impact absorption | 0.302 |
| Durability | 0.356 |
| Permeability | −0.326 |
| Stability | 0.202 |

Fig. 6

Table 2 Comparison of the proposed DMDE model with baselines on MSE loss and PAR

| Evaluated models | | MSE loss | | | PAR (%) | |
|---|---|---|---|---|---|---|
| Modality | Model | Train | Validate | Test | Overall rating | Attribute rating |
| Single modality | Image model (ResNet-50) | 0.0345 ± 0.015 | 0.0368 ± 0.0018 | 0.0408 ± 0.0022 | 76.54 ± 5.1 | 46.76 ± 4.5 |
| | Text model (BERT) | 0.0025 ± 0.007 | 0.0025 ± 0.008 | 0.0025 ± 0.0011 | 91.43 ± 2.6 | 95.46 ± 1.2 |
| Multiple modalities | Naïve fusion | 0.0016 ± 0.0003 | 0.0019 ± 0.0003 | 0.0020 ± 0.0004 | 98.27 ± 1.4 | 96.44 ± 1.1 |
| | Weighted fusion | 0.0013 ± 0.0002 | 0.0013 ± 0.0002 | 0.0014 ± 0.0005 | 98.87 ± 1.2 | 98.46 ± 0.9 |
| | Self-attention fusion | 0.0010 ± 0.0002 | 0.0010 ± 0.0003 | 0.0010 ± 0.0004 | 99.14 ± 0.8 | 99.10 ± 0.6 |

Note: Columns (1–2) are the five models including DMDE and baselines; columns (3–5) are MSE loss values for training, validating, and testing the models, respectively; columns (6–7) are the PAR of the models for overall rating and attribute-level rating of concepts, respectively.

Fig. 7

Table 3 Comparison of PAR for overall rating with different $\eta$

| Evaluated models | | PAR (%) for overall rating | | |
| --- | --- | --- | --- | --- |
| Modality | Model | $\eta = 0.1$ | $\eta = 0.075$ | $\eta = 0.05$ |
| Single modality | Image model (ResNet-50) | 76.54 | 73.71 | 68.54 |
| | Text model (BERT) | 91.43 | 90.68 | 85.23 |
| Multiple modalities | Naïve fusion | 98.27 | 97.09 | 93.41 |
| | Weighted fusion | 98.87 | 97.26 | 94.41 |
| | Self-attention fusion | 99.14 | 98.34 | 97.91 |

Fig. 8

Table 4 Comparison of testing PAR with subsets of inputs

| Evaluated models | Testing subsets | PAR (%) for overall rating | |
|---|---|---|---|
| Model | Number of images | Half-text description | Full-text description |
| DMDE model | 2 | 86.61 | 97.65 |
| | 4 | 92.71 | 98.83 |
| | 6 | 94.86 | 99.14 |

Fig. 9

MULTI-MODAL DATA-DRIVEN DESIGN CONCEPT EVALUATOR

CROSS REFERENCE TO RELATED APPLICATIONS

This application is a 371 national phase of PCT Application No. PCT/US23/10122, titled MULTI-MODAL DATA-DRIVEN DESIGN CONCEPT EVALUATOR and filed on Jan. 4, 2023, which itself claims the benefit of priority to U.S. Provisional Patent Application No. 63/296,651, filed Jan. 5, 2022; and U.S. Provisional Patent Application No. 63/310,794, filed Feb. 16, 2022; each of which applications is hereby incorporated by reference.

STATEMENT AS TO FEDERALLY SPONSORED RESEARCH

This invention was made with government support under Grant Number 2050052 awarded by the National Science Foundation. The Government has certain rights in the invention.

BACKGROUND

The present application relates generally to computer-implemented methods and systems for predicting customer sentiment for a product and different aspects thereof.

BRIEF SUMMARY OF THE DISCLOSURE

Design concept evaluation is a key process in the new product development process with a significant impact on the product's success and total cost over its life cycle. Limitations of the state-of-the-art in concept evaluation include: (1) the amount and diversity of user feedback and insights utilized by existing concept evaluation methods such as quality function deployment are limited. (2) Subjective concept evaluation methods require significant manual effort which in turn may limit the number of concepts considered for evaluation. Various embodiments disclosed herein relate to a deep multimodal design evaluation (DMDE) model to bridge these gaps by providing designers with an accurate and scalable prediction of new concepts' overall and attribute-level desirability based on large-scale user reviews on existing designs. The attribute-level sentiment intensities of users are first extracted and aggregated from online reviews. A multimodal deep regression model is then developed to predict the overall and attribute-level sentiment values based on the features extracted from orthographic product images via a fine-tuned ResNet-50 model and from product descriptions via a fine-tuned Bidirectional Encoder Representations from Transformer (BERT) model and aggregated using a novel self-attention-based fusion model. The DMDE model adds a data-driven, user-centered loop within the concept development process to better inform the concept evaluation process. Numerical experiments on a large dataset from an online footwear store indicate a promising performance by the DMDE model with 0.001 MSE loss and over 99.1% accuracy.

In accordance with one or more embodiments, a computer-implemented method is provided for predicting customer sentiment for a product and aspects thereof. The method includes: (a) receiving customer data for a plurality of products, and generating a vector of customer sentiments associated with different aspects of each of the plurality of products based on the customer data; (b) receiving images for each of the plurality of products, and generating a latent vector for the images for each product by fine-tuning a pre-trained image processing model; (c) receiving a textual description for each of the plurality of products, and generating a latent vector for the textual description for each product by fine-tuning a pre-trained natural language processing model; (d) designing a deep multimodal design evaluation (DMDE) model with a self-attention fusion mechanism to integrate the latent vectors of the images and the textual descriptions for each product to predict customer sentiment for new product designs based on their images and textual descriptions; and (e) providing a new product design to the trained DMDE model to obtain predicted customer sentiments for one or more attributes of the new product design or generating a new product design having one or more attributes having favorable predicted customer sentiments using the trained DMDE model and a generative design model.

In some embodiments, the computer-implemented methods include using customer reviews, customer survey results and online reviews posted by customers scraped from online sources.

In some embodiments, the computer-implemented methods include generating a latent vector for the images comprises, for the customer data for each product, identifying the attributes of the product discussed in the customer data, identifying the sentiments expressed for each attribute of the product, and identifying the intensity and polarity of each sentiment.

In some embodiments, the computer-implemented methods include generating a latent vector for the images further comprises aggregating customer sentiments identified for each product.

In some embodiments, the computer-implemented methods include combining the latent vector for the textual description for each product and the latent vector for the images for each product prior to designing a DMDE model using a multimodal data concatenation process.

In some embodiments, the computer-implemented methods include combining the latent vector for the textual description for each product and the latent vector for the images for each product prior to designing a DMDE model using a multimodal data concatenation process.

In some embodiments, the computer-implemented methods further include the DMDE model and the generative design model include neural network models.

In some embodiments, the computer-implemented methods further include the images to include multiple different views of each of the plurality of products.

BRIEF DESCRIPTION OF THE DRAWINGS

FIG. 6 provides Table 1, which shows an example of the sentiment analysis of one product analyzed based on multiple user reviews, where positive/negative values represent the positivity/negativity of user sentiments.

FIG. 7 provides Table 2, which shows experiments on the three fusion models for integrating image and text modalities.

FIG. 8 provides Table 3, which that shows experiments with two single modality models and the three multimodality models using different values of $\eta$.

FIG. 9 provides Table 4, which shows the results of the ablation study in terms of prediction accuracy rate for the overall rating with $\eta=0.1$.

DETAILED DESCRIPTION

Figure 1:
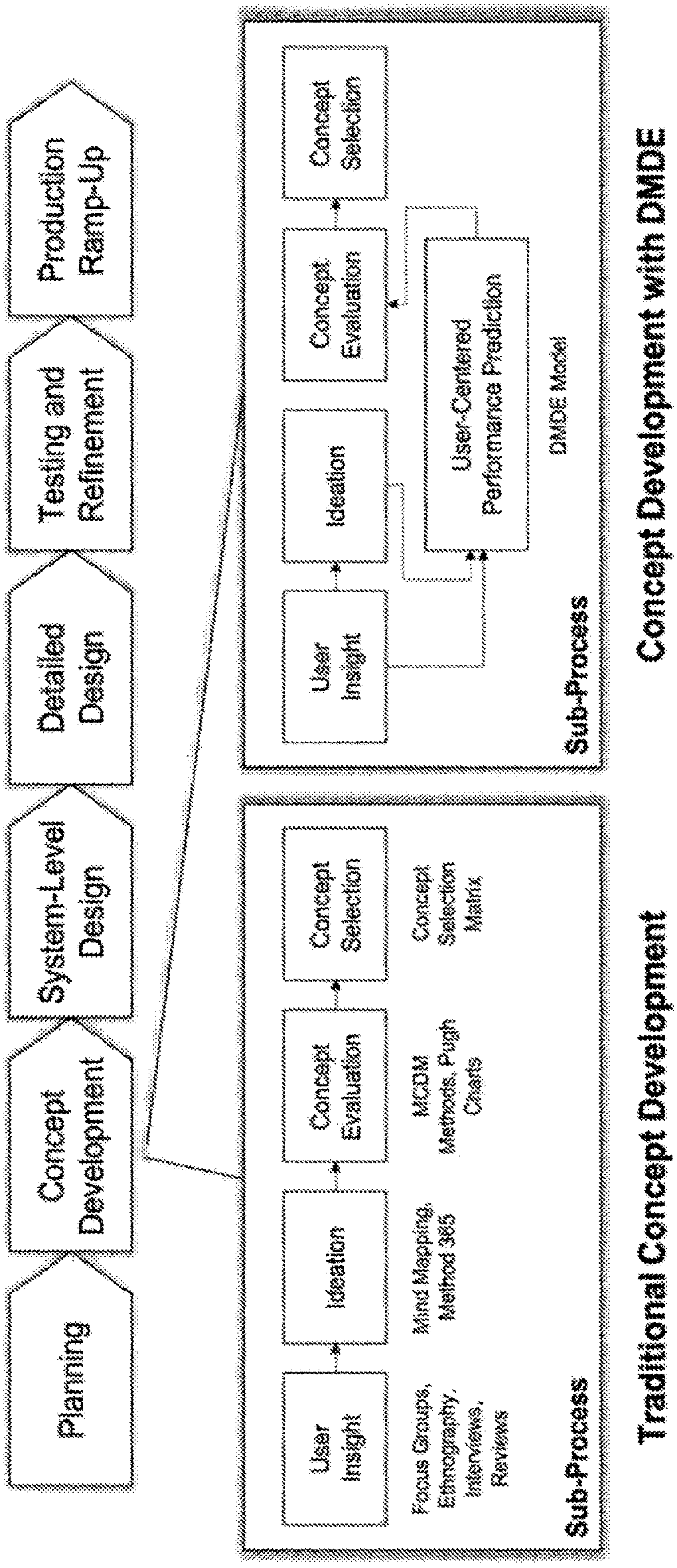
FIG. 1 illustrates application of an exemplary DMDE model in accordance with one or more embodiments in the concept development process.

Innovative design processes in early-stage product development typically involve generating and evaluating numerous alternative concepts through a variety of methods and heuristics [1]. This is a crucial requirement for a successful design process for several reasons, such as increasing the quantity of generated concepts-following Osborn's rules for brainstorming [2]—to inspire the designer's exploration and creativity [3-5], preventing the designer's fixation on a few ideas by exposing her to various concepts [6-8], and enhancing the quality of design by incorporating more creative ideas and concepts in the ideation and prototyping processes [9-11]. Evidence suggests that early-stage concept generation contributes to only about 8% of product development costs. In comparison, the decisions made during this phase can determine up to 70% of the total cost over the entire product life cycle [12]. Nevertheless, although generating a large number of novel concepts is necessary for successful innovative design in new product development processes [13,14], it is not sufficient without rigorous evaluation against a set of performance metrics that reflect users' needs.

Evaluating concepts is often difficult due to imprecise, incomplete, or subjective data [15]. As such, much research has been undertaken to develop methods to better inform the evaluation and ultimate selection of promising design concepts [16-18]. Design concept evaluation is a process in which the design team evaluates alternative design concepts and refines/narrows down a set of concepts based on their anticipated success. This is an essential step to take once a multitude of design concepts is generated [19]. Various normative decision-making tools and methods have been proposed in the literature for design concept evaluation. Examples include concept selection [16], concept screening [20], pairwise comparison charts [21], concept scoring matrices [22], multi-attribute utility analysis [23], decision matrices [24], utility function analysis [25], fuzzy sets [26], and analytic hierarchy process (AHP) [27]. Fuzzy sets and AHP are proven effective for strategic [28] and multi-criteria [29] decision-making in design concept evaluation processes. A systematic decision process via the fuzzy sets method was presented in Ref. [30] for identifying and choosing the best design concept based on expert knowledge combined with optimization-based methodology. Integrated fuzzy sets with genetic algorithms and neural networks were proposed in Ref. [18] for obtaining an optimal concept from a group of satisfactory concepts. Furthermore, an AHP-based method combined with fuzzy set theory was presented in Ref. [24] for evaluating the alternatives of conceptual design through a score-ranking mechanism. In a related study [31], an analytic network process, a more generic form of AHP, was used to determine the most satisfactory conceptual design by considering the variety of interactions and dependencies between higher and lower level elements. A different evaluation process based on fuzzy reasoning and neural networks was discussed in Ref. [32] for evaluating design concepts based on a set of user requirements.

Systematic and technology-focused methodologies for evaluating concepts and informing their selection have been a fertile and impactful area of research in design methods and tools for over two decades. However, irrespective of the systematic methodology used, a significant factor in developing and evaluating concepts is the users' insights [33]. Eliciting insights from users in the upfront of the development process has been long established as a best practice in new product development [34-37]. Multi-criteria decision-making (MCDM) methods that integrate user feedback into concept evaluation and selection include quality function deployment (QFD) [38] and experiments using data envelopment analysis [39]. Without proper user validation, establishing design prototypes and allocating resources to those potential products may lead to excessive costs in later stages due to revisions or potential failures [40].

A lack of rigorous data-driven methods exists for user-centered evaluation of design concepts, which can better inform the design team's concept evaluation and selection process. The state-of-the-art in design concept evaluation predominantly relies on the judgment and expertise of the design team—either through subjective concept rating and selection [41-43] or using the aforementioned rule-based quantitative methods (e.g., fuzzy sets, AHP). Yet, user needs and opinions are proven to play a critical role in successful concept evaluation and selection [19]. The growing popularity of online reviews on e-commerce platforms as a medium for users to express their sentiments and feedback about their experience with previous products provides an unprecedented opportunity to rethink design concept evaluation and actively engage users in the creative design process. For a new product to be a success, it must resonate with the needs and desires of large and diverse populations of users. Thus, there is a need for devising new methods that capture user sentiments and feedback on a large scale and leverage that information to project the success of new designs from the perspectives of potential users. This, in turn, would augment the ability of designers to make informed judgments and decisions during concept evaluation processes. This process has the potential to increase the quality, quantity, and diversity of user feedback versus traditional methods such as interviews, focus groups, and surveys, which are often used to inform MCDM methods such as QFD [44]. Traditionally, customer sentiments have been integrated into the new product development process in a sequential fashion before the concept development process begins or after concepts have been developed [45,46].

In accordance with one or more embodiments, a deep multimodal design evaluation (DMDE) model is provided that learns the complex relationships between the visual and functional characteristics of past designs and the attribute-level sentiments of users on a large scale and utilizes the learned patterns to measure the expected desirability of design concepts and their constituent attributes. DMDE draws on the existing literature on data-driven sentiment analysis from online reviews (e.g., Refs. [47-51]) for incorporating large-scale user feedback in concept evaluation. The process allows the development of an iterative cycle where design concepts and user feedback are automated and integrated in parallel with the concept development process, thereby providing the design team with more data to better assess and select valuable concepts. From the perspective of the concept development process, the DMDE method adds a data-driven user-centered loop during the user insight and ideation process, which allows for more expansive user sentiments to be integrated within the design process and presented during concept evaluation. The DMDE loop added to the concept development process is shown in FIG. 1.

Figure 2:
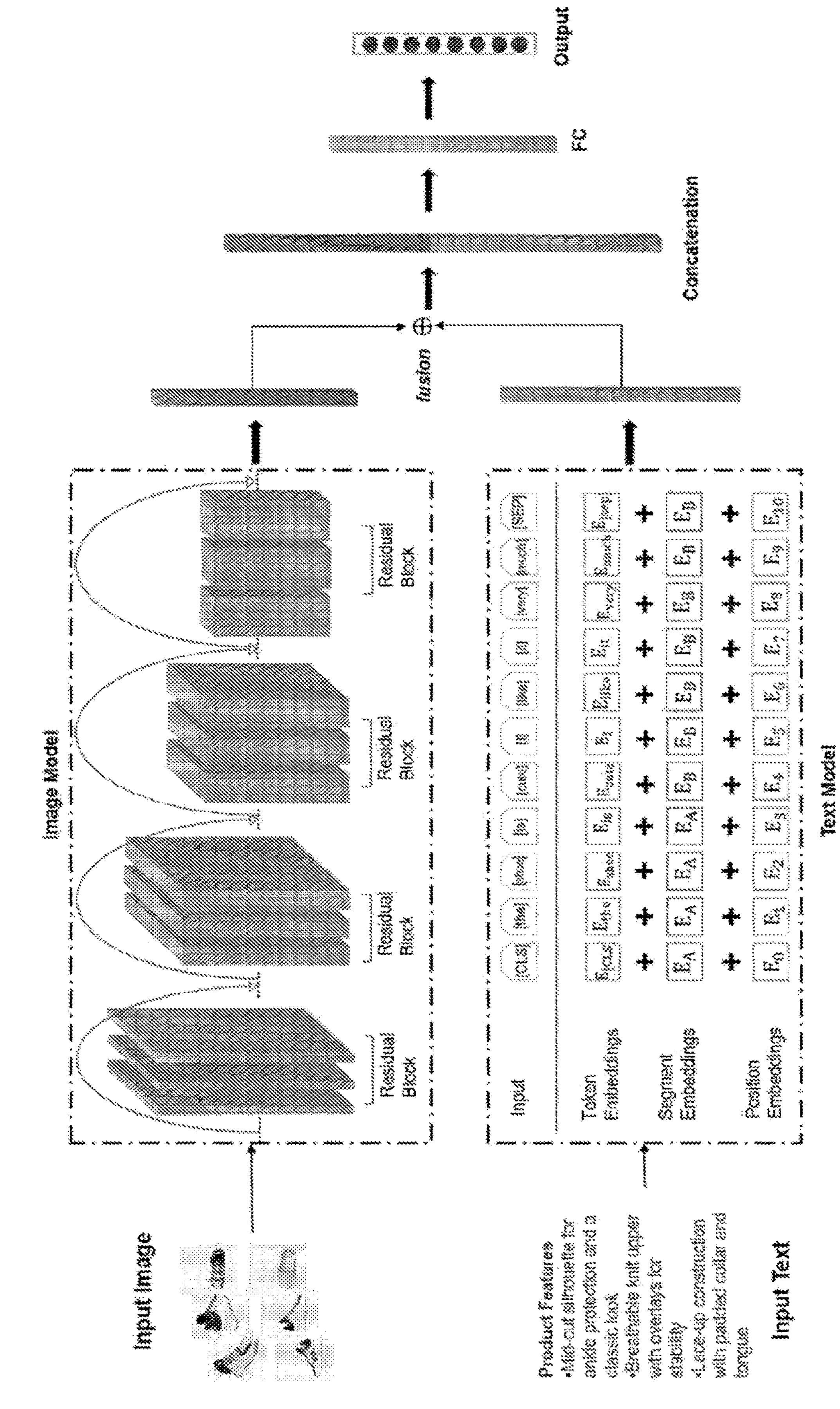
FIG. 2 provides an overview of an exemplary DMDE model in accordance with one or more embodiments.

An overview of the DMDE model is shown in FIG. 2. The DMDE model processes the orthographic views of existing products using a state-of-the-art deep neural network-based model, ResNet-50 [52], which is pretrained on Image-Net [53] and fine-tuned on the collected product dataset. The DMDE model also processes textual product descriptions using a state-of-the-art deep language model, bidirectional encoder representations from transformer (BERT) [54], which is fine-tuned on a large product description dataset. To integrate these two modalities (i.e., image and text), a self-attention mechanism is developed and tested, which is proven to outperform baseline multimodal fusion architectures in jointly learning representations from multiple modalities. Comprehensive experiments are conducted on a large-scale dataset scraped from a major online footwear store to evaluate the effectiveness of the DMDE model in predicting the desirability of a concept using its orthographic renderings and textual descriptions (see, e.g., FIG. 3). Comparative analyses are performed on the training loss and regression accuracy of the DMDE model against two single modality deep neural networks and three multimodal fusion architectures, which indicate superior performance by a wide margin in terms of both mean squared loss and prediction accuracy rate (PAR).

Figure 3:
FIG. 3 shows an example of input data for the DMDE model: orthographic product images (top) and textual product descriptions (bottom) used for predicting the overall and attribute-level user ratings.

The DMDE model addresses the challenging problem of user-centered design concept evaluation by providing a novel data-driven model that accurately predicts user sentiments and feedback for a new design concept based only upon its orthographic images and a brief description of characteristics (e.g., FIG. 3). The model can provide better user data for a design team during the concept evaluation process.

A novel multimodal deep regression architecture is provided based on a self-attention mechanism that seamlessly integrates two different modalities in an end-to-end fashion to learn representations from both visual and textual features simultaneously.

Comprehensive experiments on a large-scale, real dataset have been performed to demonstrate the feasibility and performance of the multimodal architecture compared to two sets of baselines: (a) single modality deep neural networks for image processing networks and natural language processing networks on a deep regression task and (b) three state-of-the-art multimodal fusion methods.

In one or more embodiments, the DMDE model is particularly relevant to incremental innovations or improvements to existing products in the market. In one or more embodiments, the model has an ability to predict more radical innovations in which the user has limited or no knowledge. Radical innovation is more related to technology-push innovation, in which a market is partially developed or not fully developed at all [55].

Related Work

This section presents a detailed review of the related work on various design concept evaluation approaches and multimodal networks.

Design Concept Evaluation: Efficient evaluation of design concepts is a key requirement to facilitate new product development by ensuring design creativity and quality and preventing potential failures in later stages of the product development cycle [56,57]. Various evaluation approaches have been proposed and investigated in the design literature. AHP [58] was illustrated as a decision support model to aid designers in selecting new product ideas to pursue by helping identify the relationship between various design concepts in the evaluation process. AHP was adopted by Ayag [27] to select the best concept to satisfy the expectations of both the company and its customers. With the aid of the consultative AHP for computing the concept weighting values, the technique for order preference by similarity to an ideal solution [59] was integrated and proposed to assist designers in determining the optimal conceptual alternatives for further detailed development. By integrating perception-based concept evaluation and target costing of complex and large-scale systems, a system design methodology [60] decomposes a system into modules and evaluates each module concept with its target requirements and cost. A generalized purchase modeling approach [61] that considers generic factors such as anticipated market demand for the design, designers' preferences, and uncertainty in achieving predicted design attribute levels under different usage conditions and situations was proposed to develop a user-based expected utility metric.

To make the evaluation decisions more effective and to avoid the vagueness and uncertainty of experts' subjective judgments in conventional ways, various fuzzy set-based decision-making methods and algorithms have been proposed in the literature. Ayag [62] employed a fuzzy AHP to reduce candidate concepts and exploited simulation analysis to improve the concept evaluation and selection. Further research [31,63] was conducted on the analytical network process (ANP), a more general form of AHP, to address the problem of accommodating the dependencies between higher and lower level elements. Fuzzy logic has also been proposed in con-junction with ANP to evaluate a set of conceptual design alternatives. The fuzzy-weighted average [64]method was developed to calculate desirability levels in engineering design evaluation, which suggests a new method of measuring design candidates by computing an aggregate fuzzy set [65]. A systematic decision process via the fuzzy set method [30] was also proposed in the literature to identify and choose the best design concept based upon expert knowledge and experience combined with optimization-based methodologies. Fuzzy analysis-based multi-criteria group decision-making methods [25,38] have also been employed for evaluating the performance of design alternatives, where all design alternatives are ranked and then selected according to the multiplied evaluation scores of concepts along with their weights.

To improve the evaluation process based on the fuzzy set method, interval arithmetic, rough sets, ranking design alternatives, and new methods were developed and integrated with other methods. An interval-based method [66] was proposed to effectively address uncertain and incomplete data and information in various instances of product design evaluation. Owing to the strength of rough sets in handling vagueness, a gray relation analysis integrated multi-criteria decision-making method [67] was proposed to evaluate design concepts to improve the effectiveness and objectivity of the design concept evaluation process. Other rough sets-based methods [68-70] were also developed to reduce evaluation bias in the pairwise comparison process in criteria weighting or rule mining. Integrated fuzzy sets [18] with genetic algorithms and neural networks were developed to identify the optimal concepts from a group of satisfactory concepts. Many experts apply methods of evaluating design concepts by ranking design alternatives in a qualitative fashion, such as multi-attribute utility theory [71,72], preference ranking organization method for enrichment evaluations [73,74], and technique for order preference by similarity to an ideal solution [75,76].

Data-Driven Evaluation Methods: The approaches described above are based on subjective, insufficient, and ambiguous information for design concept evaluation [77]. Most information used in existing design concept evaluation practices comes from the subjective judgments of experts, which may be biased, vague, or even inconsistent. Therefore, data-driven methods have been proposed in the literature to achieve more reliable, quantitative evaluation results. For example, support vector machine (SVM) [78] has been proposed for predicting the design concept performance. SVM-based approaches [79,80] were introduced to develop a model that predicts the users' affective responses for product form design with satisfactory predictive performance. Other studies [80,81] have also reported comparable promising evaluation results. In addition, neural network-based models [82,83] have been recently proposed for design concept evaluation. Non-parametric models exploiting artificial neural networks [84] can predict software reliability based on a single and unified modality (e.g., fault history data) without any assumptions.

An automatic process [85] was recently proposed to extract the subjective knowledge of users and represent it using a fuzzy ontology, where the inherent user information is stored as a knowledge database and can be easily accessed by others. User preferences are then extracted for group decision-making. Various group decision-making methods [86-89] have been introduced in the literature to deal with heterogeneous information in a dynamic environment and measure the consistency of preferences provided by experts. Fuzzy morphological matrix-based systematic decision-making approaches [90,91] have also been studied for validating conceptual product design by employing the knowledge and preferences of designers and users with subjective uncertainties in function solution principles to evaluate design concepts quantitatively. In recent years, radicality computing formulas [92] have been proposed to regress through a statistical analysis of known design cases for additive manufacturing. According to their degree of radicality at the very beginning of the new product development process, the approach can rank potentially radical ideas. A new metric for evaluating creativity [41] was developed utilizing adjective selection and semantic similarity to minimize the designers' biases during the evaluating process. In light of these works that improve the efficiency and effectiveness of design concept evaluation, a novel data-driven method is disclosed for design concept evaluation.

Multimodal Networks: In new product development, image processing-based and natural language processing-based approaches for need finding and design ideation have been well-studied independently in recent years. For example, image processing allows for the use of generative adversarial networks (GANs) to edit design concepts (e.g., apparel) at the attribute level automatically [93,94]. Convolutional neural network (CNN)-based architectures have also been utilized to predict the future desirability of styles discovered from fashion images in an unsupervised manner [95]. Furthermore, BERT-based approaches have been adopted in recent years to extract information about the needs of users from online reviews [96,97]. However, these approaches base their evaluations on only a single modality (e.g., product image, review), which may naturally exclude other aspects of the design concept or product that are not represented by that single modality. In the design concept evaluation processes specifically, multimodal methods can provide more comprehensive and accurate information about the expected performance of a concept based on various metrics.

Recent research in machine learning has reported promising results in combining textual and visual data to learn multiple levels of representations through hierarchy network architectures. A deep CNN model [98] was trained to detect words in images, compose words into sentences, and map them onto the image features. A generative model-based method [99] was developed to generate natural sentences describing an image in an end-to-end manner using an encoder-decoder architecture. A deep learning-based text-to-image generation method [100] was proposed which uses the long short-term memory (LSTM) architecture for iterative handwriting-based control of image generation. Another study [101] employs deep learning methods to extract audio and visual features for noise removal in speech recognition. A recurrent CNN method [102] was also proposed to capture contextual information and extract features of images for text classification without human-designed features. Another work [103]proposed a joint feature learning approach that combines image features and text embeddings to classify document images. Similarly, Yang et al. [104] developed a fully CNN model for extracting semantic structures from document images, and Xu et al. [105]proposed an architecture that jointly learns text and layout in a single framework for document classification.

These multimodality methods mainly project language and image features into a shared representation and infer a single-modal feature from another feature, like inferring image features from a linguistic feature. However, this approach is most likely to cause information loss inevitably during the feature projection process. To avoid this issue, the model disclosed herein addresses such problems by capturing the single modality features (i.e., textual product descriptions and orthographic images) independently and then integrating them in an optimized fusion. Furthermore, it is observed that a large body of past research has leveraged multiple modalities to solve classification problems [106-109], while the multimodal deep learning architecture disclosed herein solves a regression task, i.e., predicting the overall and attribute-level ratings of a new design concept based on the user sentiments and feedback of existing products.

Methodology

FIG. 2 illustrates an exemplary DMDE model in accordance with one or more embodiments. This model builds on an attribute-level analysis approach for generating user-centered ratings for products based on online reviews without loss of generality. First, a sentiment analysis method is discussed, which is utilized to quantify the attribute-level sentiment intensity of users for each product based on online reviews. Next, the deep neural network architectures for image processing and natural language processing are discussed independently, followed by a description of the multimodal fusion method to integrate image and text features and relative performance metrics used to validate the models. Finally, it is worth noting that the DMDE model is domain-agnostic and can be generalized to any type of end-user product so long as the following data are available: product images, textual descriptions of product features, and overall and/or attribute-level ratings of the past products in the domain. The model builds on an attribute-level analysis approach for generating user-centered ratings for products based on online reviews, as described next.

Attribute-Level Sentiment Analysis: A given product typically receives tens, hundreds, or even thousands of user reviews presented in the form of unstructured natural language on an e-commerce platform. To inform the design process based on users' sentiments and feedback, advanced computational methods are required to translate large-scale, unstructured natural language data into valuable design knowledge and insights. The first step of the methodology is to process individual reviews to extract the attribute-level sentiment intensity of the users (i.e., the positivity or negativity of their emotions) associated with different attributes of the product. To this end, the analysis of sentiment expressions (ASEs) approach presented in Ref. [96] is adopted to measure the attribute-level sentiment intensity of users in four steps:

- Step 1: A product attribute lexicon is created based on existing online product catalogs and attribute dictionaries. In the case of footwear, for example, various synonyms of the main attributes collected from 10,000 reviews of our scraped dataset of footwear are selected as a total of 500 attribute words and grouped into 23 main attributes (e.g., color, energy return, permeability, weight, stability, durability). Then, the attribute lexicon of the products is used to extract product attributes from user reviews.
- Step 2: The descriptions of the attributes are then tracked using natural language toolkit post tagger, which translates phrases or sentences into part-of-speech tags. Then the syntactic context of each sentence is derived. For example, a review sentence "I love the classic style" is chopped and translated into multiple pieces ("I," "PRP"), ("love," "VBP"), ("the," "DT"), ("classic," "JJ"), ("style," "NN").
- Step 3: A sentiment lexicon is built on an enhanced state-of-the-art sentiment lexicon [51], which includes manually picked sentiment words from a dictionary with a vocabulary size of over 6000 words. The sentiment lexicon can be adapted by enriching it with domain-specific sentiment expressions related to the target product (e.g., footwear).
- Step 4: Word embedding, a language modeling method that transfers words into high-dimensional vectors, is conducted to encode each word into a unique real vector so the computer can comprehend and operate on them. Word2Vec [110], one of the prominent pretrained models for word embedding, is utilized to learn word associations from a large corpus of text and translate each distinct word into a particular list of number vectors. Its simplicity drove the choice of Word2Vec for embedding. However, more advanced context-aware embedding methods such as BERT [54] can also be utilized.
- Step 5: The ASE approach utilizes the product attribute and sentiment lexicons and word embeddings to identify and map sentiment expressions to the differentiated product attributes. The sentiment expressions of users are then converted into sentiment intensity values in [−1, 1] using SenticNet, with −1 and 1 representing extremely negative sentiment and extremely positive sentiment, respectively.

The identified attribute groups along with the user sentiment intensity values extracted from the ASE approach are then utilized as labels for the training data, as described below.

Image Processing: Images are an essential part of a design concept, representing the visual aspects of a conceptual design. The image features are processed and extracted to estimate the expected user-centered desirability of a concept based on its orthographic renderings. Deep convolutional neural networks (CNNs) have led to a series of breakthroughs in image classification. The deep CNN-based model ResNet-50 [52] is a neural network used as a backbone for many computer vision tasks and has the strong ability to learn rich feature representations from a wide range of images. In one or more embodiments, the ImageNet [53] pretrained ResNet-50 model is fine-tuned based on the scraped product image dataset to extract visual features from orthographic images.

To train the model, six orthographic images of each product serve as inputs of the network. The sentiment intensity values of users on ten product attributes "Traction," "Shape," "Heel," "Cushion," "Color," "Fit," "Impact absorption," "Durability," "Permeability," and "Stability," as well as on the overall rating are served as labels of training data in [−1, 1]. Images from the dataset are first resized to a batch of 224×244×3 RGB images to fit the network. The ResNet-50 model consists of four stage residual blocks, each with a convolution and identity block. Each convolution block has three convolution, batch normalization, and ReLU layers, and each identity block also has 1 Conv 1×1 and a batch normalization layer to downsample the features. Finally, an average pool and a fully connected layer followed by a tanh function transfer features to the desired dimensional vector $X_1 \in R^{d1}$ at the end of the architecture. The ResNet-50 model has over 23 million trainable parameters in total. The main benefit of using such a deep network is that it can represent complex functions and learn features at many different levels of abstraction, from edges (at the lower layers) to very complex features (at the deeper layers) to better understand the dependency between the orthographic images of the design concepts (inputs) and the user sentiment intensity values (outputs).

Natural Language Processing: Online product catalogs typically comprise brief textual descriptions of the product features (e.g., FIG. 3). To identify the relationship between the technical descriptions of the products and the sentiment intensity of the users, BERTs [54] are utilized to train deep bidirectional representations from unlabeled text. BERT is the encoder stack of the transformer architecture [111]. A transformer architecture is an encoder—decoder network that uses self-attention on the encoder side and attention on the decoder side. In the DMDE model, a pretrained BERT by Wolf et al. [112] is adapted to learn and extract useful information from descriptive sentences in product descriptions and transform the textual content into a feature vector.

The pretrained BERT is applied on a regression task, estimating the relationship between inputs and multiple independent variables. The inputs are sentences describing the product and the multiple independent variables are sentiment intensity values in [−1, 1] associated with ten product attributes and the overall product rating. In the training process, most hyperparameters remain the same as the original BERT training. The BERT model size is L=12, H=768, and A=12, where L, H, and A denote the number of layers, a hidden layer of size, and the number of self-attention heads, respectively. The model fits the input sequence and delivers the labels of text within the sequence as an output, where the sequence of inputs starts from [CLS] containing special embeddings and finish with the token [SEP] at the end of the sequence. The model performs tokenization by splitting the input text into a 128-sequence list of tokens. The input embeddings are then passed to the attention-based bidirectional transformer. The fully connected layer is revised at the end of the BERT model to ensure the desired dimension of the output feature $X_2 \in R^{d2}$ and followed by a tanh function to predict the labels (i.e., the sentiment intensity values).

Multimodal Architecture: The image processing model and the natural language processing model extract and represent the features from images and text, respectively, in an independent fashion. Each model has the capability to map the single modality feature (i.e., orthographic product images or textual product descriptions) into the extracted overall and attribute-level product ratings in [−1, 1]. Therefore, to model the connection between the orthographic images and descriptive language as input and the extracted overall and attribute-level product ratings as output, the DMDE model is enhanced with a novel fusion model to integrate the features associated with different modalities. A design concept is evaluated based on both visual and textual information for more accurate and comprehensive evaluation. This section first describes two baseline multimodal fusion methods, followed by a novel self-attention-based multi-modal fusion model with demonstrated improved performance for integrating visual features from the ResNet-50 model and textual features from the BERT model for design concept evaluation.

Naïve Fusion: This approach integrates vectorized features from different information modes through naïve concatenation. The obtained image features $X_1 \in R^{d1}$ and text features $X_2 \in R^{d2}$ with their original dimensions are integrated. The generated multimodal features $X_m$ are given by $$X_m = X_1 \oplus X_2,\ X_m \in R^{d1+d2} \tag{1}$$

where $\oplus$ represents the concatenation operator of vectors.

Weighted Fusion: The linear weighted combination provides more flexibility for networks to assemble textual and visual representations. This approach integrates the multimodal features as follows:

$$X_m = w_1 \times X_1 \oplus w_2 \times X_2,\ X_m \in R^{d1+d2} \tag{2}$$

where $\oplus$ is the vector concatenate operator, and $w_1$ and $w_2$ denote the weighting parameters of image features and text features, respectively. The weighted parameters are tuned over the entire training process of the DMDE model.

Figure 4:
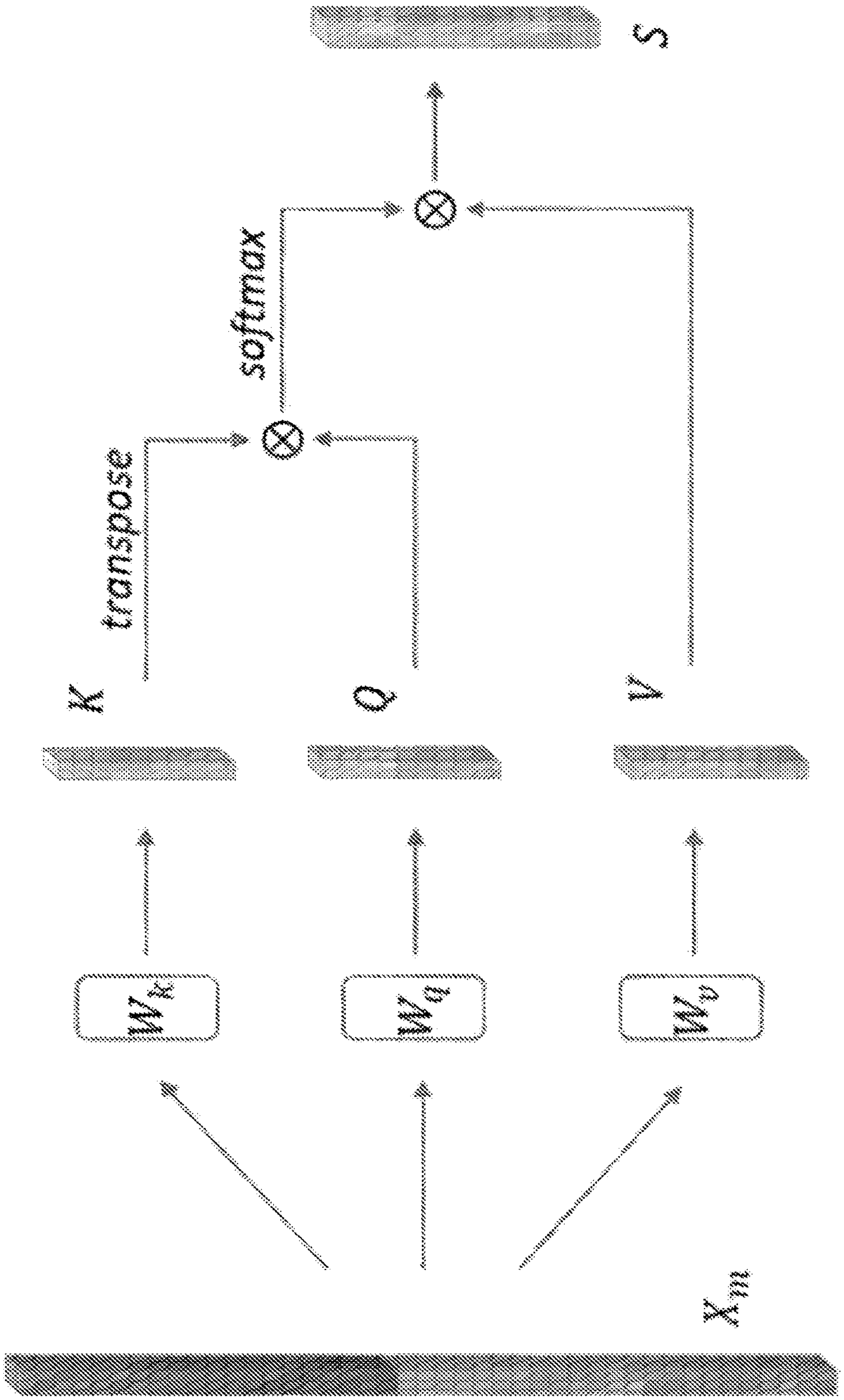
FIG. 4 provides an overview of the self-attention-based fusion module procedure.

Self-Attention Fusion: The attention mechanism is a powerful and widely used approach to integrate multiple modalities [113]. A novel self-attention-based module inspired by Vaswani et al. [111] is developed to capture the representation and connection across the complementary information of multimodal features. FIG. 4 illustrates the generation process of the multi-modal self-attention features. Naïve concatenation features $X_m = X_1 \oplus X_2$ (where $\oplus$ denotes matrix multiplication) are initiated as the input of the self-attention-based module, and then the inputs $X_m$ are projected onto a set of subspaces: query Q, key K, and value pair V. The multimodal self-attentive features S are formulated as $$S = \text{softmax}\left(\frac{QK^T}{\sqrt{d}}\right)V \tag{3}$$

$$S = [S_1, S_2, \ldots, S_n] \in R^{d_i \times n}$$

where $Q=W_q \times S$; $K=W_k \times S$; $V=W_v \times S$; $W_q$, $W_k$, and $W_k$ are three learned parameter matrices within the self-attention-based module; and d is the dimension of q, k. A softmax function is used to ensure attentions across each visual and textual cell.

Multimodal Fusion Process: The orthographic product images and textual product descriptions are used as inputs for the DMDE model (FIG. 2). The text features and image features are extracted simultaneously by the fine-tuned ResNet-50 model and BERT model, respectively. Once the two modality features are identified, they are integrated using the multimodal fusion layer constructed by the multimodal fusion methods described above. To ensure that the concatenated features have the desired dimension, a fully connected layer is added as follows to generate the final output:

$$Y' = W'^T \times S + b \tag{4}$$

where b is a bias vector and $W^T$ is the weight matrix. The entire procedure can be trained on the product images and descriptions scraped from an e-commerce platform to optimize the performance metrics described next.

Performance Metrics: The training procedure of the DMDE model is conducted using a loss function based on mean squared error (MSE). MSE is calculated as the mean or average of the squared differences between predicted and expected target values in a dataset, presented as $$MSE = \frac{1}{n}\sum_{i=1}^{n}\left(Y_i - \hat{Y}_i\right)^2 \tag{5}$$

where $Y_i$ is the expected value in the dataset and $Y\hat{}_i$ the predicted value. The MSE loss can reflect the actual situation of regression error and evaluate the performance of the multimodal networks.

To further investigate the effectiveness of the DMDE models in integrating the multimodality information and predicting the overall and attribute-level desirability of the design concepts, a PAR metric, inspired by the field accuracy rate [114], is utilized. PAR counts the number of exact matches between ground-truth and predicted results as follows:

$$PAR = \frac{\#\left|Y_i - \hat{Y}_i\right| < \eta}{N} \tag{6}$$

where $\#|Y_i - \hat{Y}_i$ is the number of products with an absolute value of the ground-truth and the predicted values below a threshold $\eta$, and N is the total number of products, $\eta$ is set to 0.1 based on empirical knowledge.

The MSE loss metric represents the squared difference between the predicted and actual performance ratings of products. Thus, a smaller loss represents the ability of the model to correctly map the images and textual descriptions of a product to its overall and attribute-level desirability. PAR is another metric that measures the rate of product performance predictions that fall within a pre-specified acceptable threshold. These metrics can help gauge the accuracy of the DMDE model and other baseline models in predicting the overall and attribute-level desirability of a new concept.

Experiments and Results

In this section, the dataset and implementation details of the DMDE model are first described, followed by an explanatory analysis of the results of multimodal networks and the comparison with single-modal networks to demonstrate the accuracy and effectiveness of DMDE in predicting the expected desirability of design concepts and their attributes.

Dataset and Implementation Details: To test and validate the performance of the multimodal networks in the evaluation of the newly designed concepts, a large-scale dataset was scraped from a major online footwear store to conduct numerical experiments. In the dataset, each product has four types of information: six orthographic images, one numerical rating score, a list of textual product descriptions, and real textual customer reviews from an e-commerce platform, where images and feature description are the inputs to the model and the numerical rating score, and sentiment intensity values analyzed from customer reviews are the outputs. A total number of 8706 images and 113,391 reviews for 1452 identified shoes were collected from an online retail store. One example from the dataset is shown in FIG. 3. The experiments are conducted with k-fold [115], with k=10, to randomly split the dataset into the train, validate and test sets with the ratio of 7:1:2. All experimental results are conducted five times and reported as mean±std to alleviate the randomness effect. All neural networks are trained on PyTorch [116]. Adam [117] optimizer with $\beta$=(0.9, 0.999) and learning rate=0.01 is used to train the model parameters and save the model with the best loss in the validation dataset. To avoid overfitting, a dropout layer is added to the self-attention fusion model with the dropout rate of $P_{drop}$=0.1. The DMDE model was trained over 40 epochs. The training time cost per epoch was 5-7 min, which added up to 3-4 h.

Data Processing: The DMDE model is designed to predict the overall and attribute-level desirability of a product regarding the frequently mentioned attributes. The dataset provides a large-scale product image and description with labels of rating score and customer reviews. However, textual customer reviews are required to be represented as readable information for networks. Therefore, 113,391 reviews for 1452 identified shoes are analyzed by the natural language processing approach ASE (Sec. 3.1) and ten frequently mentioned product attributes were selected: "Traction," "Shape," "Heel," "Cushion," "Color," "Fit," "Impact Absorption," "Durability," "Permeability," and "Stability." Nevertheless, the attribute list can be expanded beyond the above list pending the availability of a sufficiently large number of examples for training the data-driven models. The sufficiency of attribute-specific data for training the neural networks is judged based on empirical knowledge. The sentiment expressions of users for each attribute were also extracted using the ASE method and converted into numerical values ranging from −1 to 1, representing both the polarity and intensity of user sentiments. Table 1 in FIG. 6 shows an example of the sentiment analysis of one product analyzed based on multiple user reviews, where positive/negative values represent the positivity/negativity of user sentiments. The closer the value to the endpoints of [−1, 1], the higher the sentiment intensity. The ten identified attribute values and the overall rating serve as labels in the training process of the deep regression model.

Results and Analyses: To test and validate the performance of the DMDE model for design concept evaluation, an ablation study was conducted to examine two unique aspects of the DMDE model: the self-attention-based fusion model and multi-modal regression. First, the performance of the proposed self-attention-based fusion model is compared to the baseline models, naïve fusion and weighted fusion. Next, two single modality models (i.e., image-based and text-based) are used as two baselines and compared with the DMDE model. Finally, partial testing samples are presented to further demonstrate the effectiveness of the DMDE model.

Multimodal Fusion Evaluation: The experiments on the three fusion models for integrating image and text modalities are shown in the last three rows of Table 2 in FIG. 7. Mean squared error (MSE) and PAR are used to measure and compare the performance of the three fusion models. Results show that naïve concatenation provides the DMDE model with the training loss of 0.0016, validation loss of 0.0019, and testing loss of 0.0020, while weighted concatenation achieves a lower loss at about 0.0013. However, the self-attention-based fusion model significantly outperforms both the naïve fusion model and the weighted fusion model by reducing the loss by 30-50%. The low loss values for training, validation, and testing indicate that the self-attention-based fusion module is capable to integrate and extract features from multiple modalities with very few errors.

The results of the experiments also indicate that the self-attention-based fusion model outperforms both the naïve fusion model and the weighted fusion model with the highest PAR of 99.14% and 99.10% in predicting the overall rating and the attribute-level rating, respectively. Additionally, the statistical p-values corresponding to a t-test on PAR are computed to demonstrate the significance of the difference between the multimodal models in Table 2 at the significance level of 0.05. The p-value is calculated as 0.03 for the self-attention fusion model versus the naïve fusion model, and the p-value associated with the comparison between the self-attention fusion model and the weighted fusion model is 0.02. These results of this statistical hypothesis testing indicate that the self-attention fusion model significantly outperform the other multimodal models in terms of PAR. To sum up, out of the three proposed models for integrating textual descriptions and orthographic image features, the self-attention-based fusion method is proven to yield the best performance with the lowest MSE loss and the highest PAR for the DMDE model.

The limitation of naïve and weighted fusion for the DMDE model stems from the fact that the feature extraction modules for different modalities hardly interact with each other, which in turn limits their semantic relatedness and inevitably leads to information loss. Using the self-attention-based fusion method, the dependencies between the features of different modalities are not restricted by the in-between distance between them, unlike the naïve and weighted fusion methods which concatenate multimodal features. Consider a simple hypothetical example with image features [$a^1$, $a^2$] and text features [$a^3$, $a^4$]. Using the naïve and weighted fusion methods, the combined features will be $[a^1, a^2, a^3, a^4]$ and $[w^1 a^1, w^2 a^2, w^3 a^3, w^4 a^4]$, respectively, where w denotes weight.

Figure 5:
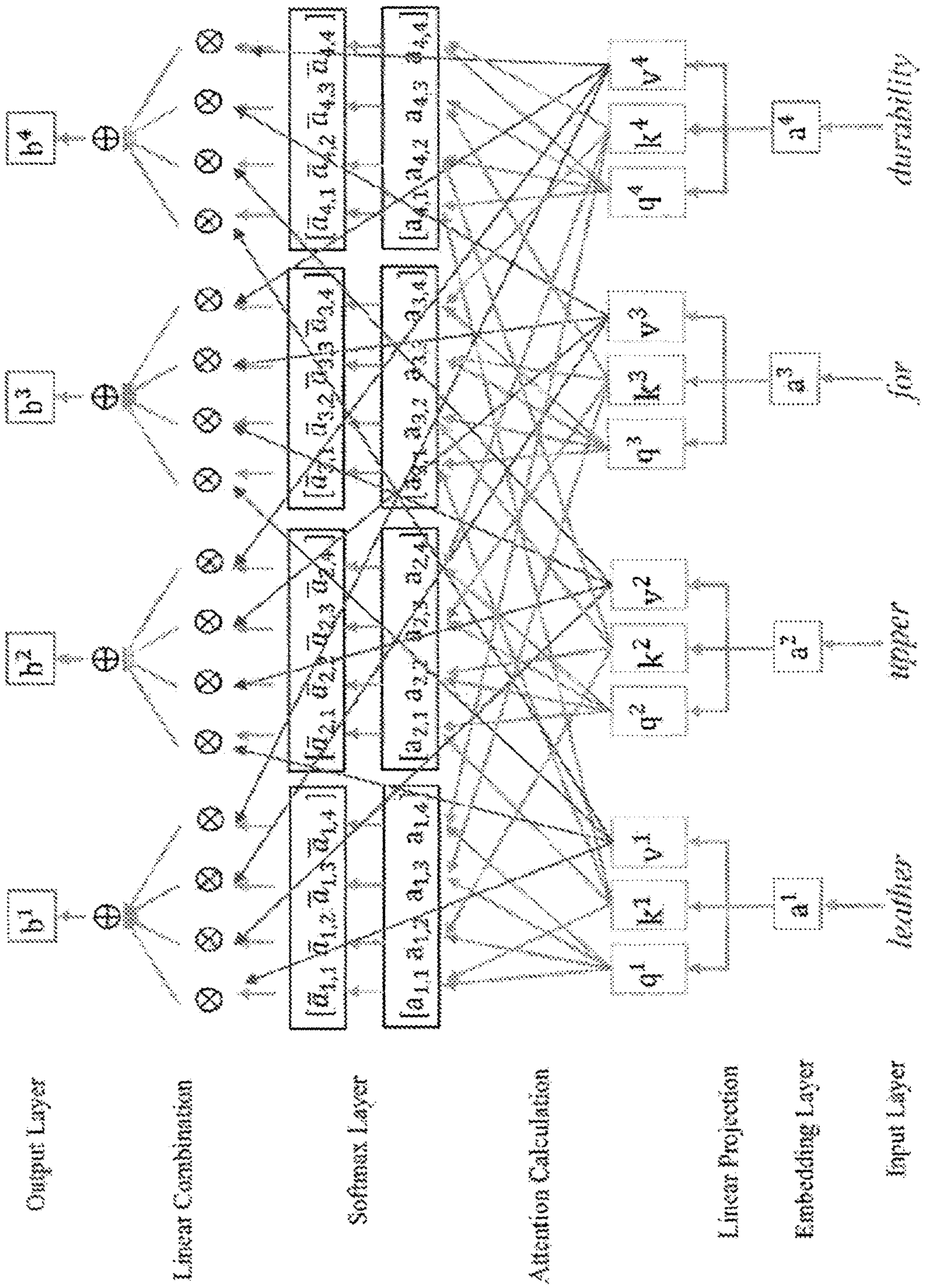
FIG. 5 shows an example of a self-attention mechanism.

The self-attention method, however, will combine these modalities as depicted in FIG. 5: the fusion of image features $[a^1, a^2]$ and text features $[a^3, a^4]$.

$$q^i = w_q a^i, k^i = w_k a^i, v^i = w_v a^i, a_{i,j} = q^{i*k} / \sqrt{d}, b^i = \sum_j \alpha i,_j \, v^j,$$

where q is query, k is key, v is value pair, $w_q$, $w_k$, $w_v$ are the target to train in a layer, d is the dimension of q, k. The self-attention mechanism learns the relationships between the modalities using three query, key, and value matrices. Query and key construct the relationships, while value summarizes an output which comprises the relationships among all elements. The self-attention mechanism allows the inputs to interact with each other (i.e., "self") and determine what to pay more attention to (i.e., "attention"). The outputs are aggregates of these interactions and attention scores. Therefore, self-attention offers a larger and more optimal parameter space. Self-attention allows for identifying the latent relationships between visual features, semantic features, and product ratings. The DMDE model with a self-attention mechanism has a promising ability to effectively capture essential features by combining the orthographic images and descriptions of products in predicting their overall and attribute-level ratings and desirability.

Single Modality Versus Multiple Modalities: The self-attention based DMDE model was shown to deliver superior performance in solving the design concepts rating regression task. To further demonstrate the effectiveness of incorporating multiple modalities in the regression process as opposed to a single modality, this section presents the results of comparisons between the pro-posed self-attention-based DMDE model and single modality-based regression networks (i.e., image or text only) as baselines (Table 2).

First, single modality regression experiments with images were conducted using the ResNet-50 model. Given the orthographic images of products as input, the deep regression network predicts the overall and attribute-level ratings. As shown in Table 2, the image-only regression model achieves MSE loss values ranging from 0.0345 to 0.0408, with about a 30% higher margin than the self-attention-based model. The PAR of the image-only regression model is 76.54% for overall ratings, over 20% lower than the PAR of the DMDE model with self-attention-based fusion. The PAR of this model for attribute-level ratings is even lower, at 46.76%, almost half of the PAR of the DMDE model. Second, single modality regression experiments with textual descriptions were conducted using the BERT model. Results shown in Table 2 indicate that the text-only regression model outperforms the image-only regression model, with the MSE loss of 0.0025 and PAR of 91.43% (overall) and 95.46% (attribute level), which was anticipated because textual descriptions naturally contain more information about the product than images. However, the results of the DMDE model are still far better than the text-only regression model, which points to the importance of incorporating multiple modalities in the regression task for more accurate and representative results.

It is observed that the image-only regression model has the capability to predict the overall rating with higher PAR than the attribute-level ratings. On the contrary, the text-only regression model performs better in predicting attribute-level ratings than the overall rating. Two speculations can be drawn from these observations. First, only three out of the ten attributes can be rated based on the visual aspects of footwear (i.e., shape, heel, color). The remainder of the attributes cannot be judged only based on the orthographic images of the footwear, even by a human. That may be one of the reasons behind the poor performance of the image-only regression model in predicting the attribute-level ratings. Although its performance in predicting the overall rating is significantly better, it is still much worse than the text-only regression model and the DMDE model due to the same reason. Second, the text-only regression model demonstrates the opposite behavior with significantly improved attribute-level rating PAR. This may be partly due to the nature of the textual product description data (see FIG. 3) which contain structure information about different attributes of the footwear. Nevertheless, the multiple-modality models are shown to outperform both models by leveraging and integrating their features.

The experimental results demonstrate that the deep multimodal networks for design concept evaluation enable state-of-the-art performance in predicting the expected overall and attribute-level ratings of products with low error and over 99.10% accuracy. Thus, the DMDE model creates an unprecedented opportunity for designers to accurately predict the expected success of their design concepts from the perspective of their end users, based only on their orthographic image renderings and standard textual descriptions.

Sensitivity to Prediction Accuracy Rate Threshold (l): In the PAR formula (Equation 6), the threshold η was initially set to 0.1 based on empirical knowledge. To test the sensitivity of the prediction performance to the value of f, the experiments with the two single modality models and the three multimodality models were conducted using different values of η as shown in Table 3. The performances of the five models with respect to PAR were compared based on three values for η: 0.1, 0.075, 0.05, and 0.01. Results of the ablation study indicate that the single modality models are more sensitive to the threshold value η than the multimodality models. Specifically, reducing η from 0.1 to 0.05, the PAR of the image-only model and the text-only model decreases by 10% and 6.7%, respectively. Yet, the same change in the value of η results in a 4.9% reduction in the PAR of the naïve fusion model, a 4.5% reduction in the PAR of the weighted fusion model, and only a 1.2% reduction in the PAR of the self-attention fusion model.

This ablation study shows that multimodality models outperform single modality models in preserving the robustness of the predicting accuracy. Specifically, the PAR of the self-attention fusion model is the least sensitive to η because of good performance in learning the relationship among large datasets. The self-attention mechanism achieves construct relationships and extracts information by constructing the relationships, summarizing all relations within inputs, and concludes an output that contains relations among input vector elements via the three subspaces and optimal parameters. The self-attention allows the image features and textual features of the input to interact with each other and find out the high correspondence between them, which explains the strong ability of the model to obtain latent representation. Therefore, self-attention ensures a better fit to the deep multimodal evaluating procedure for product design than other models. The larger η provides higher accuracy of the model's testing performance and η=0.1 allows self-attention fusion model a 99.14% accuracy which is the rationale of parameter setting for PAR metric.

Ablation Study on Multimodal Inputs: For training the DMDE model, six orthographic images of the product along with standard textual descriptions of product features serve as input. Once the model is trained, it must be able to evaluate the overall and attribute-level desirability of a new concept given its orthographic renderings and textual description data. This section presents the results of an ablation study on the input data after the DMDE model has been fully trained. The experiments are conducted to demonstrate the performance of the DMDE model during a test with different subsets of input data: a combination of two, four, or six images with full-text description or half-text description. Full-text description means the description of product features collected in the dataset is completely served as input. In the dataset, the product descriptions are itemized in several lists. To conduct the comparison, half of the lists that contain informative texts of product features are randomly selected to use as input of the model. The subsets of images are chosen randomly as well. Table 4 in FIG. 9 presents the results of the ablation study in terms of PAR for the overall rating with $\eta=0.1$. It is observed that half-text descriptions with six images achieve 2.32% and 9.53% higher PAR than half-text description with four images and two images, respectively. In contrast, the full-text description with six images leads to 1.53% and 0.31% improvement in PAR when compared to full-text description with four images and two images, respectively. These findings indicate that the DMDE model can guarantee a high accuracy of predicting the desirability of a new concept on any given number of images when full textual descriptions are provided. Furthermore, providing full-text descriptions can increase PAR by 12.75%, 6.6%, and 4.51% com-pared to half-text description, when two, four, and six images are available, respectively. Accordingly, the DMDE model appears to be significantly sensitive to the quality of textual descriptions, as the model performance considerably degrades when only half-text descriptions are provided. When full-text description is provided, however, the prediction accuracy value remains significantly high even with a small number of images (e.g., 970.65% with only two images). It is therefore concluded that once the DMDE model is trained, it can be used for evaluating new concepts even with a small number of images per concept, although a higher number of images is shown to result in higher accuracy and smaller MSE loss (see Table 2). However, it is highly recommended to provide sufficient descriptions of product features as inputs to obtain better prediction results from the DMDE model.

In summary, a novel neural network-based DMDE model is disclosed that allows for accurate prediction of the overall and attribute-level desirability of a concept with respect to concerning large-scale user sentiments and feedback on past designs. A case study on a large-scale dataset scraped from an online footwear store was conducted to test and validate the performance of the DMDE model in terms of MSE error and PAR. Ablation studies on two unique aspects of the DMDE model indicated superior performance in terms of both MSE error and PAR when (1) multiple modalities are incorporated in the regression task and (2) the modalities are integrated using the self-attention-based fusion mechanism. To construct a multimodal network, the single image processing model and natural language processing model are built independently based on state-of-the-art pretrained models ResNet-50 and BERT, respectively. The main goal of the fine-tuned ResNet-50 and BERT models is to extract useful features from orthographic product images and textual product descriptions, respectively. The self-attention method was then applied to integrate the textual and visual features and capture the dependency between multiple modalities to predict product rating labels accurately. The model can serve as an intelligent guidance tool for new product designers to predict how their concepts will perform from end users' perspectives regarding both overall and attribute-level desirability. Specifically, a design team can simply feed the photorealistic renderings and technical description of a new concept (e.g., a pair of sneakers; see FIG. 3) into the DMDE model to accurately predict its overall and attribute-level desirability based on large-scale user feedback on previous designs.

Generative Adversarial Networks (GANs)

In one or more further embodiments, as discussed below, the DMDE model is coupled with generative design algorithms for automated design concept generation. Deep generative models have been recently adopted for design automation [118-120] to improve designers' performance through co-creation with AI. Specifically, GANs [121] have shown tremendous success in a variety of generative design tasks, from topology optimization [118] to material design [122] and shape parametrization [119]. In line with Osborn's rules for brainstorming [2], these generative models have proven effective in increasing the quantity of ideas at the designer's disposal to inspire her exploration and avoid investing too heavily in few ideas. Current approaches for assessing the quality of GAN-generated samples are limited to manual assessment and the use of various convergence criteria and distance metrics for comparing real and generated images in the feature space. Some recent studies have proposed using physics-based simulators for performance assessment of generative design with respect to form and function [119]. However, those mechanisms are domain-specific and applicable to a limited set of functional attributes (e.g., aerodynamic performance). The DMDE model can bridge this knowledge gap by serving as a disruptive tool for accurate, data-driven evaluation of GAN-generated design concepts.

GANs optimize a mini-max objective where a "generator" neural network produces images by from random noise while a "discriminator" neural network determines the generator's loss function by classifying its generated samples as real or fake. State-of-the-art GAN models are capable of generating realistic and high-quality images, which promise unprecedented opportunities for generating design concepts. Yet, there is a fundamental limitation of GANs for generative design: lack of novelty and diversity in generated samples. A generative design study on a large-scale sneaker dataset based on StyleGAN, a state-of-the-art GAN architecture, was conducted to advance the understanding of the performance of these generative models in generating novel and diverse samples (i.e., sneaker images). The findings reveal that although Style-GAN is capable of generating samples with quality and realism, the generated and style-mixed samples highly resemble the training dataset (i.e., existing sneakers).

Artificial Intelligence (AI) research has been making remarkable progress in the machine's ability to generate design ideas [123]. AI can serve as an inspiration tool in the creative process and act as a generative tool to assist designers for design concept generation. AI-powered generative design tools can augment designers' ability to create concepts faster and more quantitatively due to the increased speed and efficiency they offer. The power of AI lies in the speed in which it can analyze vast amounts of data and suggest design adjustments. A designer can then choose and approve adjustments based on that data. The most effective designs to test can be created expediently, and multiple prototype versions can be A/B tested with users.

Deep generative models have been recently adopted for design automation [124-127] with the goal of improving designers' performance through co-creation with AI. Specifically, generative adversarial networks (GANs) [128] have shown tremendous success in a variety of generative design tasks, from topology optimization [127] to material design [129] and shape parametrization [130]. In line with Osborn's rules for brainstorming, generative models have proven effective in increasing the quantity of ideas at the designer's disposal to inspire their exploration [123] and avoid investing too heavily in few ideas [130]. Nevertheless, it is not clear how these deep generative models can enable the desired diversity and creativity since existing GAN architectures inherently tend to mimic the training dataset with the same statistics without expressing much originality.

In a typical GAN architecture, the generator neural network of is trained to generate samples that are almost identical to real samples, while the discriminator neural network learns to differentiate between them. GANs have made significant progress in synthesizing and generating realistic images as their central objective. Various successful GAN architectures have been proposed in recent years mostly for facial image synthesis and generation. Examples include CycleGAN [131], StyleGAN [132], PixelRNN [133], Text2lmage [134] and DiscoGAN [135]. These are powerful image synthesis models that can generate a large amount of high-quality and high-resolution images that are often hard to distinguish from real images without close inspection. Yet, the question remains on how to leverage these models in early-stage product design to generate not only realistic but also novel and diverse concepts.

A generator of a state-of-the-art GAN architecture (such as StyleGAN2 [136]) is used to generate images of sneakers based on a large training dataset scraped from multiple online sneaker stores. The trained generator can generate realistic images of sneakers, the generated samples highly resemble existing products (i.e., the training dataset). That is, the consequence of the generator focusing solely on "fooling" the discriminator by generating samples that resemble the training dataset is the lack of novelty and diversity, which limits their applicability in generative design.

In the engineering design thinking and generation process, creativity is highly valued as one of the most important elements to evaluate the effects and performance on design tasks. The definition of creativity experiences many attempts in which the "novelty" and "usefulness" are regarded as common features to describe creativity [137]. Usefulness is correlated and measured on the quality of designs thus the "novelty" and "quality" are also used to represent the creativity [138]. Some studies define novelty as a metric for "how unusual or unexpected an idea is compared to other ideas" [137], and some studies measure the creativity, quantity, quality, and diversity of the generated designs [139]. Creativity has been seen as the design's success mostly, however, it is hard to assess and enhance the creativity of design effectively and efficiently because of its intangible and subjective nature. A significant amount of research currently is focused on have been studying the engineering design tools aiming to address these aspects of design.

Deep generative modeling is one of the most promising areas of modern AI studied within the engineering design community to enhance creativity. Research on generative design is a design exploration method performed by varying design parameters of the geometry directly. The generative model is an architecture that, given a training dataset, can learn its probability distribution and generate new samples with the same statistics as the training data. Among the generative models, GANs express a great capability and success to generate realistic design images. GANs can generate images from random noise and require no detailed information or labels from existing samples to start the generation [128]. GANs have been applied to engineering design generation, such as generating 3D aircraft models in native format for complex simulation [126], numerous wheel design options optimized for engineering performance [127], realistic samples from paired fashion clothing distribution, and providing real samples to pair with arbitrary fashion units for style recommendation [140-142], and new outfits with precise regions conforming to a language description while retaining wearer's body structure [143, 144]. Most of these models are usually built with quality to ensure the usefulness; however, their intrinsic creativity is limited. The rationale behind the lack of creativity is that during the training process, the GAN generator is encouraged to generate samples close to the training data distribution to fool the discriminator in a minimax game, which inevitably results in limited diversity and overall creativity. Besides the common attributes of creativity, quality and novelty, another term "diversity" is used to better represent the creativity of the generative design community [145].

The overall logic of a standard GAN is discussed below, followed by the description of the generative design process based on StyleGAN/StyleGAN2 architectures [132,136].

Generative Adversarial Networks: A standard GAN architecture comprises two neural networks: a generator G and a discriminator D, which are interactively trained by competing against each other in a minimax game. The generator attempts to produce realistic samples while the discriminator attempts to distinguish the fake samples from the real ones. The parameters of both networks are updated through backpropagation with the following learning objective:

$$\min_G \max_D \mathbb{E}_{x\sim p_{data}}[\log D(x)] + \mathbb{E}_{z\sim p_z}[\log(1 - D(G(z)))] \tag{7}$$

where z is a random or encoded vector, $p_{data}$ is the empirical distribution of training images, and $p_z$ is the prior distribution of z (e.g., normal distribution).

In the standard GANs model, there is no control over the modes of the data being generated. GANs are notoriously difficult to train [146] and may often be unstable due to mode collapse, one of the main problems in the generative model [127]. In this way, it is not a good choice to use this approach for generating realistic designs especially considering the significant developments of GANs, which established a new state-of-the-art in generated images with high-quality and high-resolution. This work builds on a cutting-edge GAN architecture for artificial image generation, called StyleGAN2 [136]. StyleGAN, created by NVIDIA, produces facial images in high resolution with unprecedented quality, and is capable of synthesizing and mixing non-existent photorealistic images [132].

Style-based Generative Adversarial Networks: StyleGAN and its extension, StyleGAN2, are characterized by an architecture that is different from the standard GAN generator. Conventional generators feed the latent code through the input layer only and map the input to an intermediate latent space. In StyleGAN2, however, a latent vector z is first normalized and then mapped by a mapping network m to an intermediate vector w. A synthesis network g starts with a constant layer B with a base size. The learned affine transform A is modulated with trainable convolution weights w and then demodulated to reduce artifacts caused by arbitrary amplification of certain feature maps via instance normalization. Gaussian noise inputs are scaled by a trainable factor B and added to the convolution output at each style block with bias b. The Leaky ReLU is deployed as a nonlinear activation for all layers. The output is fed into 1×1 convolutional filter to generate an image at the last layer. The loss function used in StyleGAN2 is the logistic loss function with the path length regularization:

$$\mathbb{E}_{w,y\sim N(0,I)}(\|\nabla_w(g(w)\cdot y\|_2-a)^2 \quad (8)$$

where w is a mapped latent code, g is a generator, y are random images with normally distributed pixel intensities, and a is set as a dynamical constant learned as the long-running exponential moving average of the first term over optimization. Including the bias can regularize the gradient magnitude of a generated image g (w) projected on y and adjust it to be similar as the running exponential average, thus to make the latent space w smoother. The loss function of the discriminator is same as the standard logistic loss function with R1 or R2 regularization.

The StyleGAN/StyleGAN2 architecture is capable of controlling the features of generated images at various scales due to its two sub-network consisted generator. With the inclusion of path-length regularization, StyleGAN2 enhances the condition of the generator and reduces the representation error [147]. Style-GAN2 provides superior quality and resolution of generated images compared to previous generative models [148]. However, extant applications and extensions of this architecture are predominantly focused on the quality and realism of the generated samples without addressing diversity or novelty.

Style Mixing: In addition to their ability to generate realistic images with high resolution, the StyleGAN/StyleGAN2 architectures allow for style mixing-combining the latent codes of two generated samples to create a mix of them. Style mixing is an operation where a given percentage of images are generated using two random latent codes instead of one during training. When generating the image, two latent codes z1, z2 are fed through the mapping network, and they have the two intermediate latent vectors $w_1$, $w_2$ corresponding to two sets of styles. Then, partial $w_1$ applied before the crossover point and the partial $w_2$ after it are used together to generate an image. This regularization trick prevents the network from assuming that adjacent styles are correlated, which improves the localization considerably. See [132, 136] for details of StyleGAN/StyleGAN2.

The dataset and StyleGAN2 implementation process for generating visual designs of sneakers is discussed below, followed by an explanatory analysis of the generated results with style mixing. The performance are compared with existing works and a discussion on the capability of StyleGAN2 is presented with emphasis on creativity.

Dataset and Training: To test and validate the performance of the StyleGAN2 in generating realistic and diverse images, a large-scale dataset was scraped from a major online footwear store to conduct numerical experiments. In order to avoid mode collapse and increase the diversity of dataset, several brands of footwear are included in the dataset including Adidas, ASICS, Converse, Crocs, Champion, FILA, PUMA, Lactose, New Balance, Nike, and Reebok. A total of 6745 images were collected and cleaned from an online retail store where the images of footwear have only two orthographic perspectives: a side view and a ¾ view.

The neural network models were trained in PyTorch [149] implementation of the StyleGAN2 and performed on 4 Tesla V100-SXM2 GPUs with PyTorch 1.8 and Python 3.7. Most of the configurations remain unchanged where the dimensionality of latent codes z and w are 512 and mapping network architecture are 8 fully connected layers. For style-based generator, leaky ReLU activation was used with α=0.2, bilinear filtering in all up/down-sampling layers, and equalized learning rate for all trainable parameters. Other settings include minibatch standard deviation layer at the end of the discriminator, exponential moving average of generator weights, style mixing regularization, and non-saturating logistic loss with R1 regularization. The optimizer used is Adam with the hyperparameters b1=0.5, b2=0.9, e=10-8, and minibatch=64.

Figure 10:
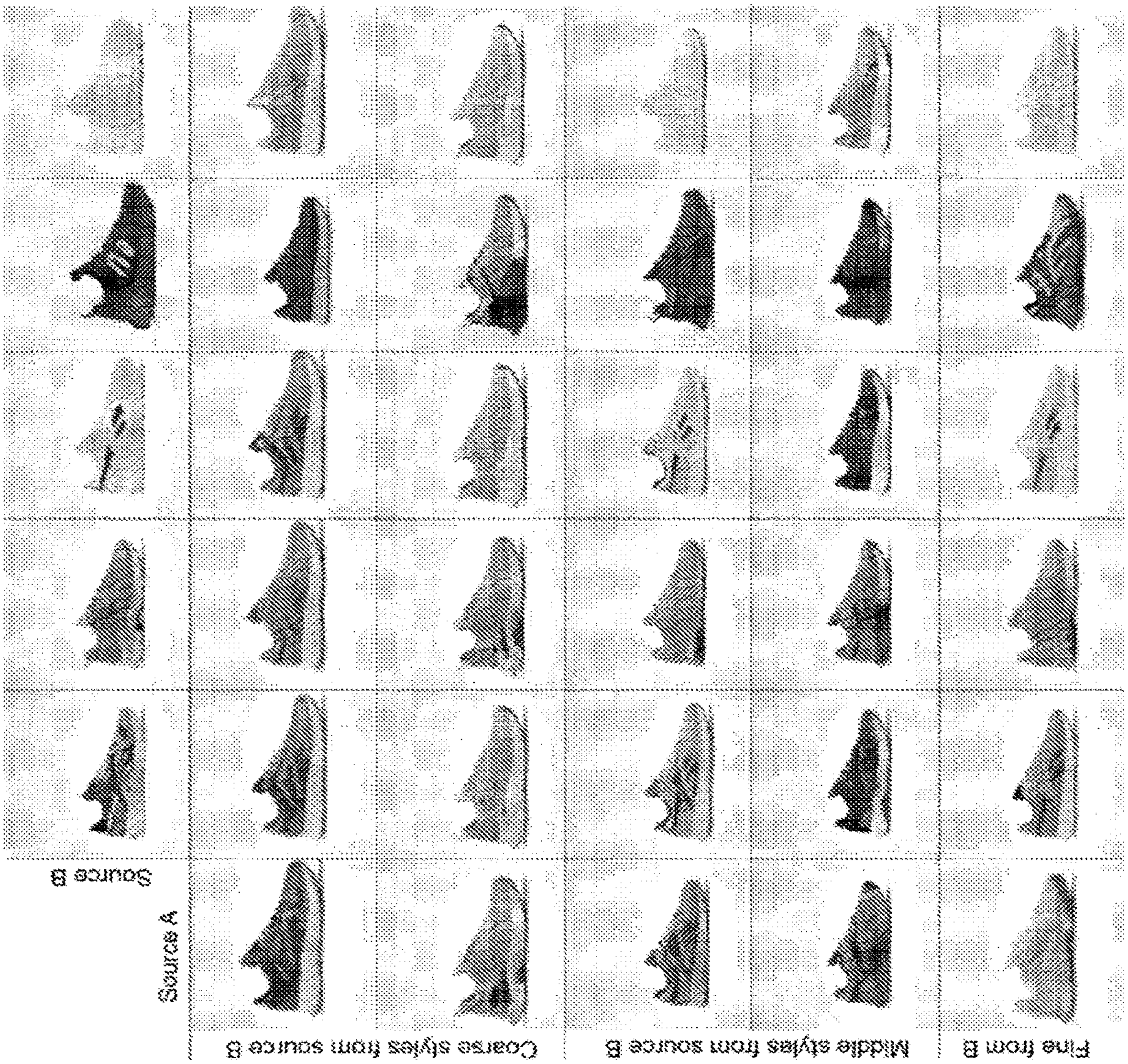
FIG. 10 shows image generation and style mixing from two sets of side-view latent codes in accordance with one or more embodiments.
Figure 11:
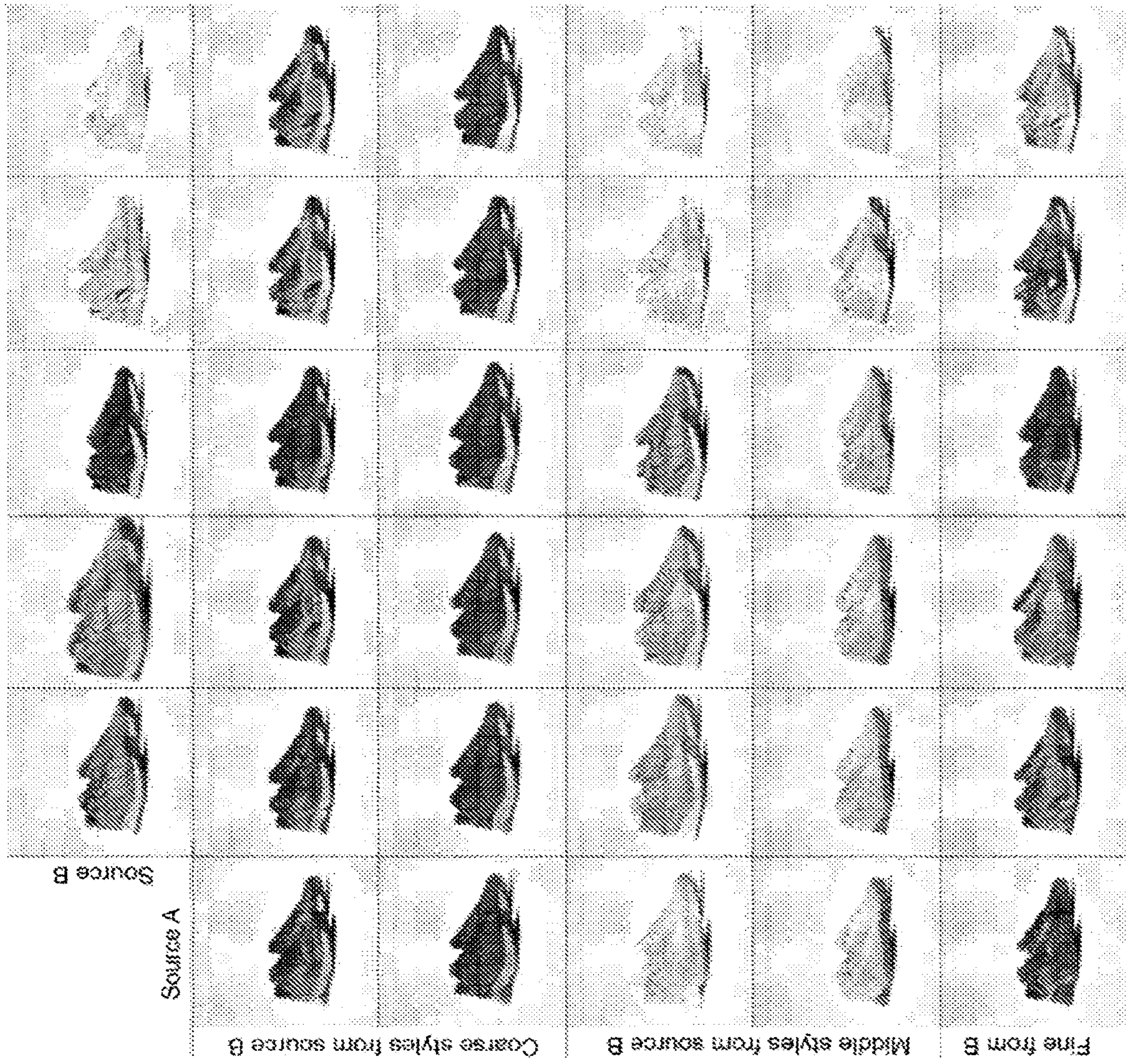
FIG. 11 shows image generation and style mixing from two sets of ¾ view latent codes in accordance with one or more embodiments.
Figure 12:
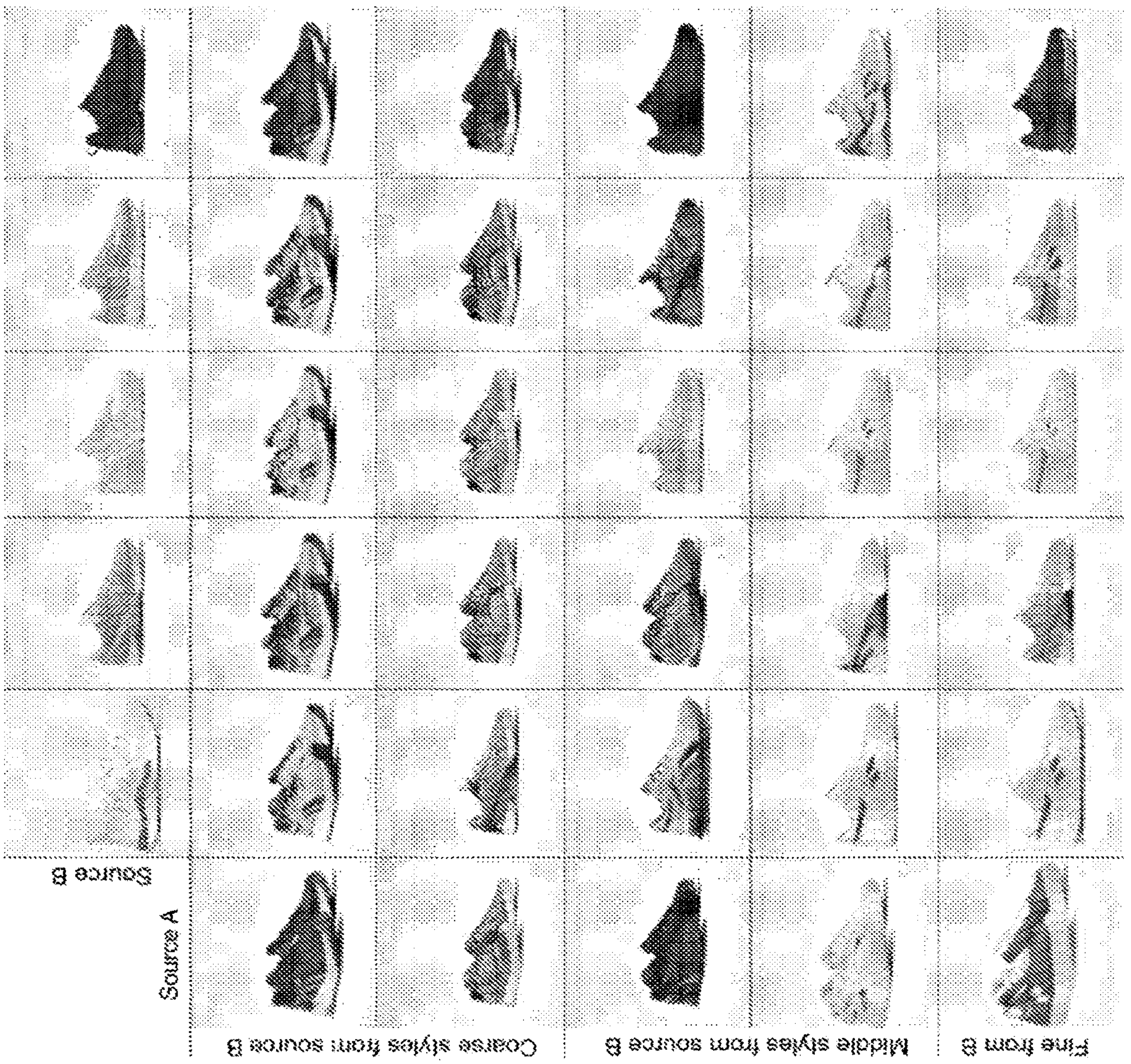
FIG. 12 shows image generation and style mixing from one set of side-view and one set of ¾ view latent codes in accordance with one or more embodiments.

Results: FIGS. 10-12 present examples of new images generated, and images synthesized by mixing two latent codes at various scales. In each figure, the set of five images on the first left column are generated images from the random noise, named source A, and the set of five images on the first top are generated from perspective random noise, named source B. The rest of the images, called style mixing images, were generated by copying a specific subset of styles from source B and taking the rest of the styles from source A. FIGS. 10 and 11 show the synthesized sneaker images resulted from mixing side orthographic views and ¾ views, respectively. In FIGS. 12, source A is taken from ¾ view images and source B is taken from side view images.

Four important observations from these examples are as follows. First, the style mixing images in the second and third rows were synthesized with more similarity to source A and little features from source B, which indicates that the model copies the styles corresponding to coarse spatial resolutions from source B and brings high-level aspects such as general sneaker style, overall shape, and orientation from source A. Second, the style mixing images listed in the last row demonstrate mainly fine style variation from source B, such as color, outlook patterns, heel counter, midsole, and outsole tread. Third, the rest of style mixed images preserve the middle style from both source A and source B, where some features from source A can be observed and some features from source B are easily recognized in different shoes. Fourth, it can be inspected visually that both the generated samples and the synthesized ones highly resemble existing shoe models and brands, which concurs with the aforementioned limitation of GAN generators to training dataset, as elaborated next.

Frechet inception distance (FID) is applied to evaluate the quality of the generated images. It measures the discrepancy between two sets of images by comparing the distributions of randomly sampled real images from a training set and generated images [150]. The FID values are calculated for every pair of images. The average value and lower scores have been shown to correlate well with higher quality images. Conversely, a higher score indicates a lower-quality image. In the experiment results, the FID value decreased from 289.65 to 18.97 after 65,000 training steps and converged. The small FID value of the experiments demonstrate well performance of the StyleGAN2 model and confirm that the generated samples are realistic and high quality.

Figure 13:
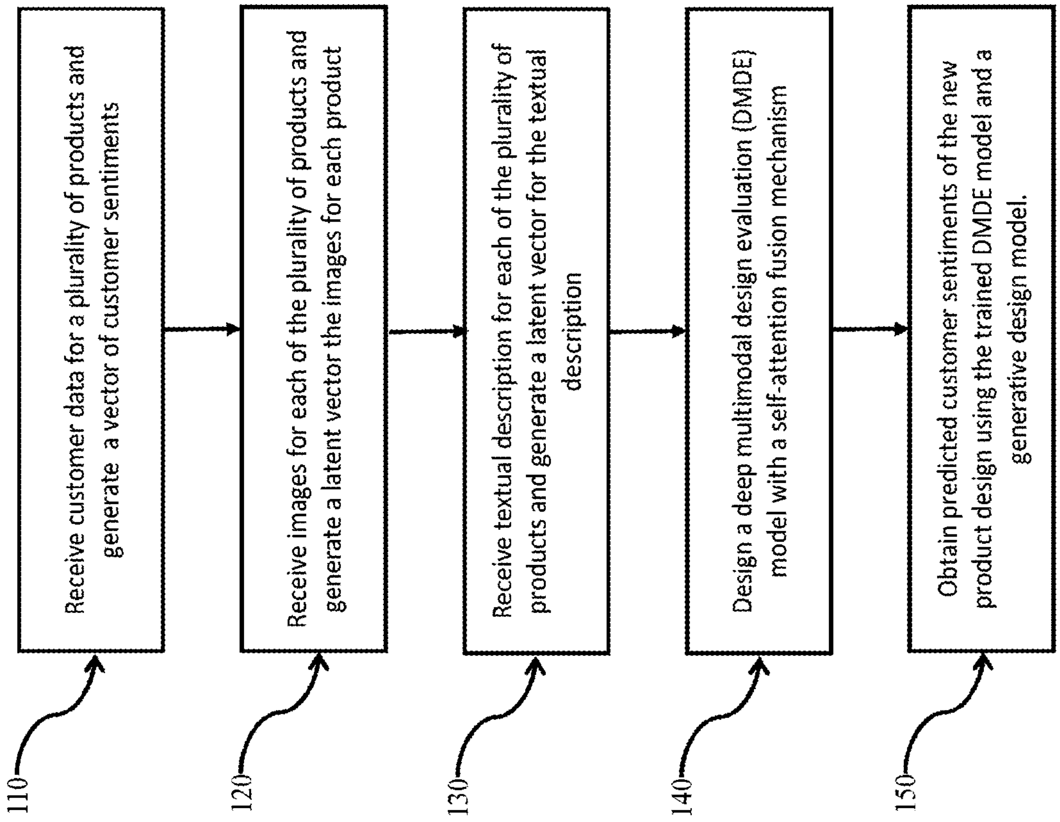
FIG. 13 is a flow diagram of an example process of predicting customer sentiment for a product.

FIG. 13 is a flow diagram of an example process 100 for predicting customer sentiment for a product. Customer data for a plurality of products is received and a vector of customer sentiments is generated (110). For example, products typically receive tens, hundreds, or even thousands of user reviews presented in the form of unstructured natural language on an e-commerce platform. In exemplary embodiments, this step involves processing individual reviews to extract the attribute-level sentiment intensity of the users (i.e., the positivity or negativity of their emotions) associated with different attributes of the product. In exemplary embodiments, a product attribute lexicon is created based on existing online product catalogs and attribute dictionaries. In exemplary embodiments, the attribute lexicon of the products is used to extract product attributes from user reviews. In exemplary embodiments, the descriptions of the attributes are then tracked using a natural language toolkit post tagger, which translates phrases or sentences into part-of-speech tags. In exemplary embodiments, a sentiment lexicon is built on an enhanced state-of-the-art sentiment lexicon, which includes manually picked sentiment words from a dictionary with a vocabulary size of over 6000 words. In exemplary embodiments, Word2Vec is utilized to learn word associations and translate each distinct word into a particular list of number vectors. In exemplary embodiments, the sentiment expressions of users are then converted into sentiment intensity values in [−1, 1] using SenticNet, with −1 and 1 representing extremely negative sentiment and extremely positive sentiment, respectively.

Images for each of the plurality of products is received and a latent vector the images for each product is generated (120). In exemplary embodiments, images of a plurality of products are received and image features are processed and extracted to estimate the expected user-centered desirability of a concept based on its orthographic renderings. In exemplary embodiments, the Image-Net pretrained ResNet-50 model is fine-tuned based on the scraped product image dataset to extract visual features from orthographic images. In exemplary embodiments, to train the model, six orthographic images of each product serve as inputs of the network. In exemplary embodiments, the sentiment intensity values of users on ten product attributes “Traction,” “Shape,” “Heel,” “Cushion,” “Color,” “Fit,” “Impact absorption,” “Durability,” “Permeability,” and “Stability,” as well as on the overall rating are served as labels of training data in [−1, 1].

Textual description for each of the plurality of products is received and a latent vector for the textual description is generated (130). In exemplary embodiments, online product catalogs that include brief textual descriptions of the product features is received. In exemplary embodiments, to identify the relationship between the technical descriptions of the products and the sentiment intensity of the users, BERTs are utilized to train deep bidirectional representations from unlabeled text. BERT is the encoder stack of the transformer architecture. In exemplary embodiments, the pretrained BERT is applied on a regression task of estimating the relationship between inputs and multiple independent variables. In exemplary embodiments, the inputs are sentences describing the product and the multiple independent variables are sentiment intensity values in [−1, 1] associated with ten product attributes and the overall product rating.

A DMDE model with a self-attention fusion mechanism is designed (140). In exemplary embodiments, to model the connection between the orthographic images and descriptive language as input and the extracted overall and attribute-level product ratings as output, the DMDE model is designed and enhanced with a novel fusion model to integrate the features associated with different modalities. In exemplary embodiments, the training procedure of the DMDE model is conducted using a loss function based on mean squared error (MSE).

Predicted customer sentiments of the new product design is obtained using the trained DMDE model (150). For example, the DMDE model predicts the expected overall and attribute-level ratings of products with low error and high accuracy. Thus, the DMDE model is used by designers to accurately predict the expected success of their design concepts from the perspective of their end users, based only on their orthographic image renderings and standard textual descriptions. In exemplary embodiments, the DMDE model can be used as an intelligent guidance tool for new product designers to predict how their concepts will perform from end users' perspectives regarding both overall and attribute-level desirability. Specifically, a design teams can simply feed the photorealistic renderings and technical description of a new concept into the DMDE model to accurately predict its overall and attribute-level desirability based on large-scale user feedback on previous designs.

Figure 14:
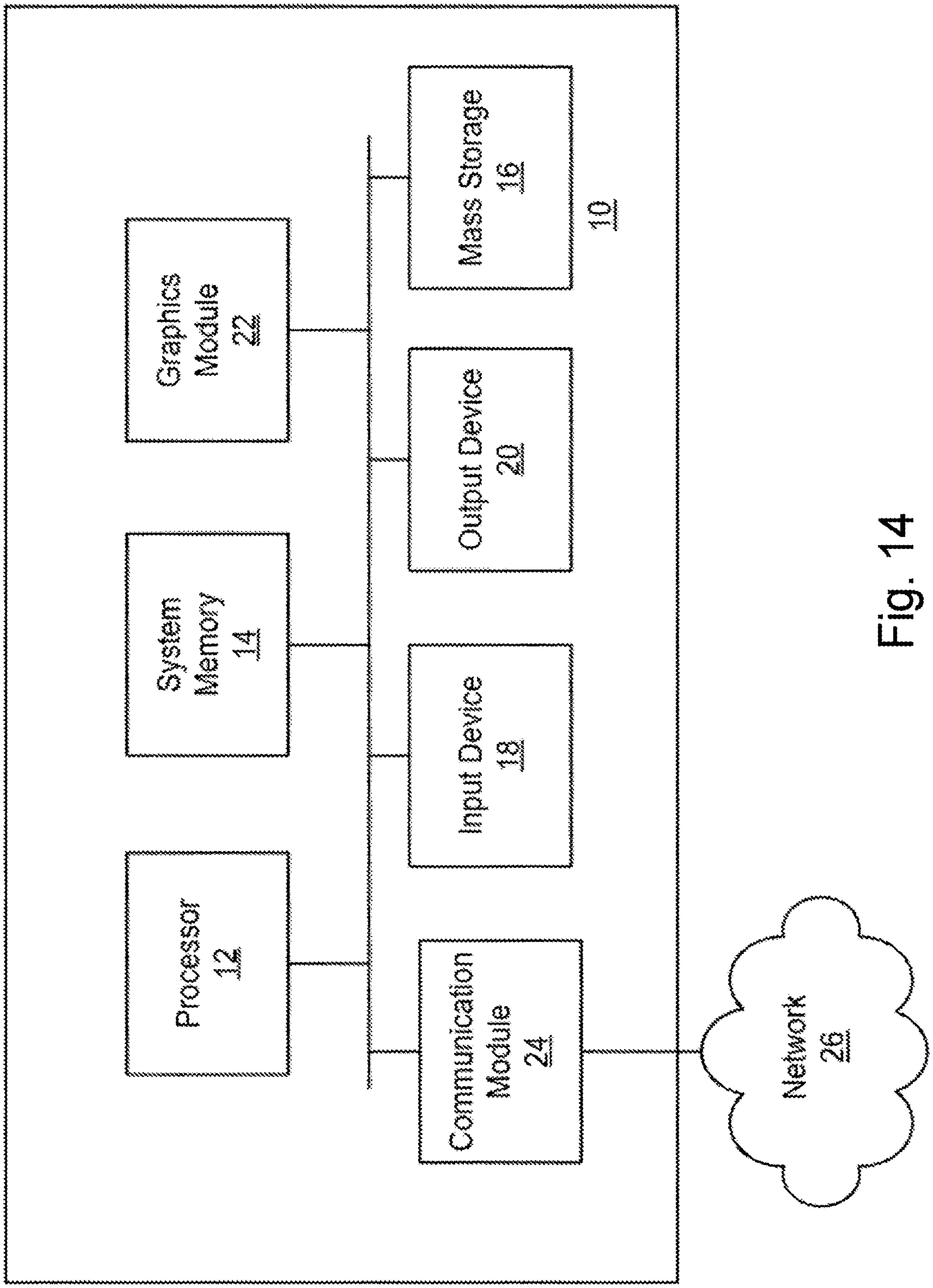
FIG. 14 is a simplified block diagram illustrating an exemplary computer system for predicting customer sentiment for a product in accordance with one or more embodiments.

The methods, operations, modules, and systems described herein for predicting customer sentiment for a product may be implemented in one or more computer programs executing on a programmable computer system. FIG. 14 is a simplified block diagram illustrating an exemplary computer system 10, on which the computer programs may operate as a set of computer instructions. The computer system 10 includes at least one computer processor 12, system memory 14 (including a random-access memory and a read-only memory) readable by the processor 12. The computer system also includes a mass storage device 16 (e.g., a hard disk drive, a solid-state storage device, an optical disk device, etc.). The computer processor 12 is capable of processing instructions stored in the system memory or mass storage device. The computer system additionally includes input/output devices 18, 20 (e.g., a display, keyboard, pointer device, etc.), a graphics module 22 for generating graphical objects, and a communication module or network interface 24, which manages communication with other devices via telecommunications and other networks 26.

Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

REFERENCES

[1] Takeuchi, H., and Nonaka, I., 1986, “The New Product Development Game,” Harvard Business Rev., 64(1), pp. 137-146.

[2] Osborn, A., 1953, Applied Imagination, Scribner's, New York.
[3] Yilmaz, S., Seifert, C., Daly, S. R., and Gonzalez, R., 2016, "Design Heuristics in Innovative Products," J. Mech. Des., 138(7), p. 071102.
[4] Crismond, D. P., and Adams, R. S., 2012, "The Informed Design Teaching and Learning Matrix," J. Eng. Educ., 101(4), p. 738.
[5] Forbes, H., and Schaefer, D., 2018, "Crowdsourcing in Product Development: Current State and Future Research Directions," Proceedings of the DESIGN 2018 15th International Design Conference, Dubrovnik, Croatia, May 21-24, pp. 579-588.
[6] Mumford, M. D., Feldman, J. M., Hein, M. B., and Nagao, D. J., 2001, "Tradeoffs Between Ideas and Structure: Individual Versus Group Performance in Creative Problem Solving," J. Creat. Behav., 35(1), pp. 1-23.
[7] Linsey, J. S., Clauss, E. F., Kurtoglu, T., Murphy, J. T., Wood, K. L., and Markman, A. B., 2011, "An Experimental Study of Group Idea Generation Techniques: Understanding the Roles of Idea Representation and Viewing Methods," ASME J. Mech. Des., 133(3), p. 031008.
[8] Yilmaz, S., Daly, S. R., Seifert, C. M., and Gonzalez, R., 2016, "Evidence-Based Design Heuristics for Idea Generation," Des. Stud., 46 (C), pp. 95-124.
[9] Simonton, D. K., 1990, Psychology, Science, and History: An Introduction to Historiometry, Yale University Press, New Haven, CT.
[10] Daly, S. R., Seifert, C. M., Yilmaz, S., and Gonzalez, R., 2016, "Comparing Ideation Techniques for Beginning Designers," ASME J. Mech. Des., 138(10), p. 101108.
[11] Han, J., Shi, F., Chen, L., and Childs, P. R., 2018, "The Combinator-A Computer-Based Tool for Creative Idea Generation Based on a Simulation Approach," Des. Sci., 4(11), pp. 1-34.
[12] Gerhard, P., and Karl-Heinrich, G., 1984, Engineering Design: A Systematic Approach, Springer, Berlin, Germany.
[13] Howard, T. J., Culley, S., and Dekoninck, E. A., 2011, "Reuse of Ideas and Concepts for Creative Stimuli in Engineering Design," J. Eng. Des., 22(8), pp. 565-581.
[14] Gray, C. M., McKilligan, S., Daly, S. R., Seifert, C. M., and Gonzalez, R., 2019, "Using Creative Exhaustion to Foster Idea Generation," Int. J. Technol. Des. Educ., 29(1), pp. 177-195.
[15] Shidpour, H., Da Cunha, C., and Bernard, A., 2016, "Group Multi-Criteria Design Concept Evaluation Using Combined Rough Set Theory and Fuzzy Set Theory," Expert Syst. Appl., 64(C), pp. 633-644.
[16] Pugh, S., and Clausing, D., 1996, Creating Innovtive Products Using Total Design: The Living Legacy of Stuart Pugh, Addison-Wesley Longman Publishing Co Inc., Boston, MA.
[17] Tsai, H.-C., and Hsiao, S.-W., 2004, "Evaluation of Alternatives for Product Customization Using Fuzzy Logic," Inform. Sci., 158(10), pp. 233-262.
[18] Huang, H.-Z., Bo, R., and Chen, W., 2006, "An Integrated Computational Intelligence Approach to Product Concept Generation and Evaluation," Mech. Mach. Theory, 41(5), pp. 567-583.
[19] Huang, H.-Z., Liu, Y., Li, Y., Xue, L., and Wang, Z., 2013, "New Evaluation Methods for Conceptual Design Selection Using Computational Intelligence Techniques," J. Mech. Sci. Technol., 27(3), pp. 733-746.
[20] Ulrich, K. T., 2003, Product Design and Development, Tata McGraw-Hill Education, New York.
[21] Dym, C. L., Wood, W. H., and Scott, M. J., 2002, "Rank Ordering Engineering Designs: Pairwise Comparison Charts and Borda Counts," Res. Eng. Des., 13(4), pp. 236-242.
[22] Frey, D. D., Herder, P. M., Wijnia, Y., Subrahmanian, E., Katsikopoulos, K., and Clausing, D. P., 2009, "The Pugh Controlled Convergence Method: Model-Based Evaluation and Implications for Design Theory," Res. Eng. Des., 20(1), pp. 41-58.
[23] Scott, M. J., and Antonsson, E. K., 1998, "Aggregation Functions for Engineering Design Trade-offs," Fuzzy Sets Syst., 99(3), pp. 253-264.
[24] King, A. M., and Sivaloganathan, S., 1999, "Development of a Methodology for Concept Selection in Flexible Design Strategies," J. Eng. Des., 10(4), pp. 329-349.
[25] Thurston, D., and Carnahan, J., 1992, "Fuzzy Ratings and Utility Analysis in Preliminary Design Evaluation of Multiple Attributes," ASME J. Mech. Des., 114(4), pp. 648-658.
[26] Wang, J., 2001, "Ranking Engineering Design Concepts Using a Fuzzy Outranking Preference Model," Fuzzy Sets Syst., 119(1), pp. 161-170.
[27] Ayag*, Z., 2005, "An Integrated Approach to Evaluating Conceptual Design Alternatives in a New Product Development Environment," Int. J. Prod. Res., 43(4), pp. 687-713.
[28] Papadakis, V. M., andBarwise, P., 2002, "HowMuch DoCEOs and Top Managers Matter in Strategic Decision-Making?," Br. J. Manage., 13(1), pp. 83-95.
[29] Scott, M. J., 2002, "Quantifying Certainty in Design Decisions: Examining AHP," International Design Engineering Technical Conferences and Computers and Information in Engineering Conference, Montreal, Quebec, Canada, September 29-October 2, Vol. 3624, pp. 219-229.
[30] Malekly, H., Mousavi, S. M., and Hashemi, H., 2010, "A Fuzzy Integrated Methodology for Evaluating Conceptual Bridge Design," Expert Syst. Appl., 37(7), pp. 4910-4920.
[31] Ayag, Z., and Ozdem[idot]r, R., 2007, "An Analytic Network Process-Based Approach to Concept Evaluation in a New Product Development Environment," J. Eng. Des., 18(3), pp. 209-226.
[32] Huang, H.-Z., Li, Y., Liu, W., Liu, Y., and Wang, Z., 2011, "Evaluation and Decision of Products Conceptual Design Schemes Based on Customer Requirements," J. Mech. Sci. Technol., 25(9), pp. 2413-2425.
[33] Ramanujan, D., Nawal, Y., Reid, T., and Ramani, K., 2015, "Informing Early Design Via Crowd-Based Co-creation," International Design Engineering Technical Conferences and Computers and Information in Engineering Conference, Boston, MA, August 2-5, Vol. 57175, American Society of Mechanical Engineers, p. V007T06A043.
[34] Griffin, A., and Hauser, J. R., 1993, "The Voice of the Customer," Market. Sci., 12(1), pp. 1-27.
[35] Cooper, R. G., 2008, "Perspective: The Stage-Gate® Idea-to-Launch Process—Update, What's New, and Nexgen Systems," J. Prod. Innov. Manage., 25(3), pp. 213-232.
[36] Zheng, J., and Jakiela, M. J., 2009, "An Investigation of the Productivity Difference in Mechanical Embodiment Design Between Face-to-Face and Threaded Online Collaboration," Proceedings of the ASME 2009 International Design Engineering Technical Conferences and Computers and Information in Engineering Conference, San Diego, CA, August 30-September 2, Vol. 48999, pp. 1173-1182.

[37] Burnap, A., Hartley, J., Pan, Y., Gonzalez, R., and Papalambros, P. Y., 2016, "Balancing Design Freedom and Brand Recognition in the Evolution of Automotive Brand Styling," Des. Sci., 2(9), pp. 1-28.

[38] Zhang, Z., and Chu, X., 2009, "A New Integrated Decision-Making Approach for Design Alternative Selection for Supporting Complex Product Development," Int. J. Comput. Int. Manuf., 22(3), pp. 179-198.

[39] Sa'Ed, M. S., and Al-Harris, M. Y., 2014, "New Product Concept Selection: An Integrated Approach Using Data Envelopment Analysis (DEA) and Conjoint Analysis (CA)," Int. J. Eng. Technol., 3(1), p. 44.

[40] Feyzioglu, O., and Buyukozkan, G., 2006, "Evaluation of New Product Development Projects Using Artificial Intelligence and Fuzzy Logic," International Conference on Knowledge Mining and Computer Science, Las Vegas, NV, June 26-29, Vol. 11, pp. 183-189.

[41] Gosnell, C. A., and Miller, S. R., 2016, "But Is It Creative?Delineating the Impact of Expertise and Concept Ratings on Creative Concept Selection," ASME J. Mech. Des., 138(2), p. 021101.

[42] Toh, C. A., and Miller, S. R., 2015, "How Engineering Teams Select Design Concepts: A View Through the Lens of Creativity," Des. Stud., 38 (C), pp. 111-138.

[43] Nikander, J. B., Liikkanen, L. A., and Laakso, M., 2014, "The Preference Effect in Design Concept Evaluation," Des. Stud., 35(5), pp. 473-499.

[44] Hauser, J. R., and Clausing, D., 1988, The House of Quality, Harvard Business Review.

[45] Liedtka, J., 2015, "Perspective: Linking Design Thinking With Innovation Outcomes Through Cognitive Bias Reduction," J. Prod. Innov. Manage., 32(6), pp. 925-938.

[46] Ulrich, K., and Eppinger, S., 2016, Product Design and Development, McGraw-Hill Education, New York.

[47] Suryadi, D., and Kim, H. M., 2019, "A Data-Driven Methodology to Construct Customer Choice Sets Using Online Data and Customer Reviews," ASME J. Mech. Des., 141(11), p. 111103.

[48] Joung, J., and Kim, H. M., 2021, "Approach for Importance-Performance Analysis of Product Attributes From Online Reviews," ASME J. Mech. Des., 143(8), p. 081705.

[49] Zhang, L., Wang, S., and Liu, B., 2018, "Deep Learning for Sentiment Analysis: A Survey," Wiley Interdiscipl. Rev.: Data Mining Knowledge Discov., 8(4), p. e1253.

[50] Tang, H., Tan, S., and Cheng, X., 2009, "A Survey on Sentiment Detection of Reviews," Expert Syst. Appl., 36(7), pp. 10760-10773.

[51] Liu, B., 2010, "Sentiment Analysis and Subjectivity," Handbook of Natural Language Processing, 2nd ed., N. Indurkhya and F. J. Damerau, eds, Vol. 2, pp. 627-666.

[52] He, K., Zhang, X., Ren, S., and Sun, J., 2016, "Deep Residual Learning for Image Recognition," Proceedings of the IEEE Conference on Computer Vision and Pattern Recognition, Las Vegas, NV, June 27-30, pp. 770-778.

[53] Deng, J., Dong, W., Socher, R., Li, L.-J., Li, K., and Fei-Fei, L., 2009, "ImageNet: A Large-Scale Hierarchical Image Database," IEEE Conference on Computer Vision and Pattern Recognition, Miami, FL, June 20-25, pp. 248-255.

[54] Devlin, J., Chang, M.-W., Lee, K., and Toutanova, K., 2018, "BERT: Pre-Training of Deep Bidirectional Transformers for Language Understanding," Proceedings of the 2019 Conference of the North American Chapter of the Association for Computational Linguistics: Human Language Technologies, {NAACL-HLT}2019, Minneapolis, MN, June 2-7.

[55] Verganti, R., 2008, "Design, Meanings, and Radical Innovation: A Metamodel and a Research Agenda," J. Prod. Innov. Manage., 25(5), pp. 436-456.

[56] Zhu, G.-N., Hu, J., Qi, J., Gu, C.-C., and Peng, Y.-H., 2015, "An Integrated AHP and Vikor for Design Concept Evaluation Based on Rough Number," Adv. Eng. Inform., 29(3), pp. 408-418.

[57] Toh, C. A., and Miller, S. R., 2016, "Choosing Creativity: The Role of Individual Risk and Ambiguity Aversion on Creative Concept Selection in Engineering Design," Res. Eng. Des., 27(3), pp. 195-219.

[58] Calantone, R. J., Di Benedetto, C. A., and Schmidt, J. B., 1999, "Using the Analytic Hierarchy Process in New Product Screening," J. Prod. Innov. Manage.: Inter. Public Product Dev. Manage. Assoc., 16(1), pp. 65-76.

[59] Lin, M.-C., Wang, C.-C., Chen, M.-S., and Chang, C. A., 2008, "Using AHP and Topsis Approaches in Customer-Driven Product Design Process," Comput. Ind., 59(1), pp. 17-31.

[60] Takai, S., and Ishii, K., 2006, "Integrating Target Costing Into Perception-Based Concept Evaluation of Complex and Large-Scale Systems Using Simultaneously Decomposed QFD," ASME J. Mech. Des, 128(6), pp. 1186-1195.

[61] Besharati, B., Azarm, S., and Kannan, P., 2006, "A Decision Support System for Product Design Selection: A Generalized Purchase Modeling Approach," Decision Support Syst., 42(1), pp. 333-350.

[62] Ayag, Z., 2005, "A Fuzzy AHP-Based Simulation Approach to Concept Evaluation in a NPD Environment," IIE Trans., 37(9), pp. 827-842.

[63] Ayag, Z., and Ozdemir, R. G., 2009, "A Hybrid Approach to Concept Selection Through Fuzzy Analytic Network Process," Comput. Ind. Eng., 56(1), pp. 368-379.

[64] Vanegas, L., and Labib, A., 2001, "Application of New Fuzzy-Weighted Average (NFWA) Method to Engineering Design Evaluation," Int. J. Prod. Res., 39(6), pp. 1147-1162.

[65] Vanegas, L. V., and Labib, A. W., 2005, "Fuzzy Approaches to Evaluation in Engineering Design," ASME J. Mech. Des., 127(1), pp. 24-33.

[66] Chin, K.-S., Yang, J.-B., Guo, M., and Lam, J. P.-K., 2009, "An Evidential-Reasoning-Interval-Based Method for New Product Design Assessment," IEEE Trans. Eng. Manage., 56(1), pp. 142-156.

[67] Zhai, L.-Y., Khoo, L.-P., and Zhong, Z.-W., 2009, "Design Concept Evaluation in Product Development Using Rough Sets and Grey Relation Analysis," Expert Syst. Appl., 36(3), pp. 7072-7079.

[68] Li, Y., Tang, J., Luo, X., and Xu, J., 2009, "An Integrated Method of Rough Set, Kano's Model and AHP for Rating Customer Requirements' Final Importance," Expert Syst. Appl., 36(3), pp. 7045-7053.

[69] Aydogan, E. K., 2011, "Performance Measurement Model for Turkish Aviation Firms Using the Rough-AHP and Topsis Methods Under Fuzzy Environment," Expert Syst. Appl., 38(4), pp. 3992-3998.

[70] Zou, Z., Tseng, T.-L. B., Sohn, H., Song, G., and Gutierrez, R., 2011, "A Rough Set Based Approach to Distributor Selection in Supply Chain Management," Expert Syst. Appl., 38(1), pp. 106-115.

[71] Ashour, O. M., and Kremer, G. E. O., 2013, "A Simulation Analysis of the Impact of Fahp-maut Triage Algorithm on the Emergency Department Performance Measures," Expert Syst. Appl., 40(1), pp. 177-187.

[72] Jimenez, A., Mateos, A., and Sabio, P., 2013, "Dominance Intensity Measure Within Fuzzy Weight Oriented Maut: An Application," Omega, 41(2), pp. 397-405.
[73] Kilic, H. S., Zaim, S., and Delen, D., 2015, "Selecting "the Best" ERP System for SMES Using a Combination of ANP and Promethee Methods," Expert Syst. Appl., 42(5), pp. 2343-2352.
[74] Vetschera, R., and De Almeida, A. T., 2012, "A Promethee-Based Approach to Portfolio Selection Problems," Comput. Oper. Res., 39(5), pp. 1010-1020.
[75] Song, W., Ming, X., and Wu, Z., 2013, "An Integrated Rough Number-Based Approach to Design Concept Evaluation Under Subjective Environments," J. Eng. Des., 24(5), pp. 320-341.
[76] Ayag, Z., 2016, "An Integrated Approach to Concept Evaluation in a New Product Development," J. Intell. Manuf., 27(5), pp. 991-1005.
[77] Zhang, Z.-J., Gong, L., Jin, Y., Xie, J., and Hao, J., 2017, "A Quantitative Approach to Design Alternative Evaluation Based on Data-Driven Performance Prediction," Adv. Eng. Inform., 32 (C), pp. 52-65.
[78] Cortes, C., and Vapnik, V., 1995, "Support-Vector Networks," Mach. Learn., 20(3), pp. 273-297.
[79] Shieh, M.-D., and Yang, C.-C., 2008, "Classification Model for Product Form Design Using Fuzzy Support Vector Machines," Comput. Ind. Eng., 55(1), pp. 150-164.
[80] Yang, C.-C., and Shieh, M.-D., 2010, "A Support Vector Regression Based Prediction Model of Affective Responses for Product Form Design," Comput. Ind. Eng., 59(4), pp. 682-689.
[81] Yang, C.-C., 2011, "Constructing a Hybrid Kansei Engineering System Based on Multiple Affective Responses: Application to Product Form Design," Comput. Ind. Eng., 60(4), pp. 760-768.
[82] Hsiao, S.-W., and Huang, H.-C., 2002, "A Neural Network Based Approach for Product Form Design," Des. Stud., 23(1), pp. 67-84.
[83] Hsiao, S.-W., and Tsai, H.-C., 2005, "Applying a Hybrid Approach Based on Fuzzy Neural Network and Genetic Algorithm to Product Form Design," Int. J. Ind. Ergon., 35(5), pp. 411-428.
[84] Roy, P., Mahapatra, G., Rani, P., Pandey, S., and Dey, K., 2014, "Robust Feedforward and Recurrent Neural Network Based Dynamic Weighted Combination Models for Software Reliability Prediction," Appl. Soft. Comput., 22 (C), pp. 629-637.
[85] Morente-Molinera, J., Perez, I., Urena, M., and Herrera-Viedma, E., 2016, "Creating Knowledge Databases for Storing and Sharing People Knowledge Automatically Using Group Decision Making and Fuzzy Ontologies," Inform. Sci., 328 (C), pp. 418-434.
[86] Lourenzutti, R., and Krohling, R. A., 2016, "A Generalized Topsis Method for Group Decision Making With Heterogeneous Information in a Dynamic Environment," Inform. Sci., 330 (C), pp. 1-18.
[87] Zhang, X., Ge, B., Jiang, J., and Tan, Y., 2016, "Consensus Building in Group Decision Making Based on Multiplicative Consistency With Incomplete Reciprocal Preference Relations," Knowled.-Based Syst., 106(5), pp. 96-104.
[88] Cabrerizo, F. J., Moreno, J. M., Perez, I. J., and Herrera-Viedma, E., 2010, "Analyzing Consensus Approaches in Fuzzy Group Decision Making: Advantages and Drawbacks," Soft Comput., 14(5), pp. 451-463.
[89] Perez, I. J., Cabrerizo, F. J., Alonso, S., and Herrera-Viedma, E., 2013, "A New Consensus Model for Group Decision Making Problems With Non-homogeneous Experts," IEEE Trans. Syst. Man Cybernet.: Syst., 44(4), pp. 494-498.
[90] Ma, H., Chu, X., Xue, D., and Chen, D., 2017, "A Systematic Decision Making Approach for Product Conceptual Design Based on Fuzzy Morphological Matrix," Expert Syst. Appl., 81(C), pp. 444-456.
[91] Zheng, H., Feng, Y., Gao, Y., and Tan, J., 2018, "A Robust Predicted Performance Analysis Approach for Data-Driven Product Development in the Industrial Internet of Things," Sensors, 18(9), p. 2871.
[92] Liu, W., Tan, R., Cao, G., Zhang, Z., Huang, S., and Liu, L., 2019, "A Proposed Radicality Evaluation Method for Design Ideas at Conceptual Design Stage," Comput. Ind. Eng., 132 (C), pp. 141-152.
[93] Kang, W.-C., Fang, C., Wang, Z., and McAuley, J., 2017, "Visually-Aware Fashion Recommendation and Design With Generative Image Models," 2017 IEEE International Conference on Data Mining (ICDM), New Orleans, LA, November 18-21, IEEE, pp. 207-216.
[94] Yuan, C., and Moghaddam, M., 2020, "Attribute-Aware Generative Design With Generative Adversarial Networks," IEEE Access, 8 (C), p. 190710.
[95] Al-Halah, Z., Stiefelhagen, R., and Grauman, K., 2017, "Fashion Forward: Forecasting Visual Style in Fashion," Proceedings of the IEEE International Conference on Computer Vision, Venice, Italy, October 22-29, pp. 388-397.
[96] Han, Y., and Moghaddam, M., 2021, "Analysis of Sentiment Expressions for User-Centered Design," Expert Syst. Appl., 171 (C), p. 114604.
[97] El Dehaibi, N., Goodman, N. D., and MacDonald, E. F., 2019, "Extracting Customer Perceptions of Product Sustainability From Online Reviews," ASME J. Mech. Des., 141(12), p. 121103.
[98] Fang, H., Gupta, S., Iandola, F., Srivastava, R. K., Deng, L., Dollir, P., Gao, J., He, X., Mitchell, M., Platt, J. C., Zitnick, C. L., and Zweig, G., 2015, "From Captions to Visual Concepts and Back," 2015 IEEE Conference on Computer Vision and Pattern Recognition (CVPR), Boston, MA, June 7-12, pp. 1473-1482.
[99] Vinyals, O., Toshev, A., Bengio, S., and Erhan, D., 2015, "Show and Tell: A Neural Image Caption Generator," 2015 IEEE Conference on Computer Vision and Pattern Recognition (CVPR), Boston, MA, June 7-12, pp. 3156-3164.
[100] Gregor, K., Danihelka, I., Graves, A., Rezende, D., and Wierstra, D., 2015, "Draw: A Recurrent Neural Network for Image Generation," Proceedings of the 32nd International Conference on Machine Learning, Lille, France, July 6-11, PMLR, pp. 1462-1471.
[101] Huang, J., and Kingsbury, B., 2013, "Audio-Visual Deep Learning for Noise Robust Speech Recognition," 2013 IEEE International Conference on Acoustics, Speech and Signal Processing, Vancouver, Canada, May 26-31, pp. 7596-7599.
[102] Lai, S., Xu, L., Liu, K., and Zhao, J., 2015, "Recurrent Convolutional Neural Networks for Text Classification," Proceedings of the Twenty-Ninth AAAI Conference on Artificial Intelligence, Austin, TX, January 25-30, AAAI Press, pp. 2267-2273.
[103] Audebert, N., Herold, C., Slimani, K., and Vidal, C., 2019, "Multimodal Deep Networks for Text and Image-Based Document Classification," Joint European Conference on Machine Learning and Knowledge Discovery in Databases, Wurzburg, Germany, September 16-20, Springer, pp. 427-443.

[104] Yang, X., Yumer, E., Asente, P., Kraley, M., Kifer, D., and Lee Giles, C., 2017, "Learning to Extract Semantic Structure From Documents Using Multimodal Fully Convolutional Neural Networks," Proceedings of the IEEE Conference on Computer Vision and Pattern Recognition, Honolulu, HI, July 21-26, pp. 5315-5324.
[105] Xu, Y., Li, M., Cui, L., Huang, S., Wei, F., and Zhou, M., 2020, "Layoutlm: Pre-training of Text and Layout for Document Image Understanding," Proceedings of the 26th ACM SIGKDD International Conference on Knowledge Discovery & Data Mining, Virtual Event, CA, July 6-10.
[106] Ngiam, J., Khosla, A., Kim, M., Nam, J., Lee, H., and Ng, A. Y., 2011, "Multimodal Deep Learning," Proceedings of the 28th International Conference on International Conference on Machine Learning, Bellevue, WA, June 28-July 2, pp. 689-696.
[107] Lynch, C., Aryafar, K., and Attenberg, J., 2016, "Images Don't Lie: Transferring Deep Visual Semantic Features to Large-Scale Multimodal Learning to Rank," Proceedings of the 22nd ACM SIGKDD International Conference on Knowledge Discovery and Data Mining, San Francisco, CA, August 13-17, pp. 541-548.
[108] Kiros, R., Salakhutdinov, R., and Zemel, R., 2014, "Multimodal Neural Language Models," International Conference on Machine Learning, Beijing, China, June 21-26, PMLR, pp. 595-603.
[109] Gong, Y., Wang, L., Hodosh, M., Hockenmaier, J., and Lazebnik, S., 2014, "Improving Image-Sentence Embeddings Using Large Weakly Annotated Photo Collections," European Conference on Computer Vision, Zurich, Switzerland, September 6-12, Springer, pp. 529-545.
[110] Mikolov, T., Sutskever, I., Chen, K., Corrado, G. S., Dean, J., Burges, C. J. C., Bottou, L., Welling, M., Ghahramani, Z., and Weinberger, K. Q., 2013, "Distributed Representations of Words and Phrases and Their Compositionality," Advances in Neural Information Processing Systems, Lake Tahoe, NV, December 5-10.
[111] Vaswani, A., Shazeer, N., Parmar, N., Uszkoreit, J., Jones, L., Gomez, A. N., Kaiser, L., and Polosukhin, I., 2017, "Attention Is All You Need," 31st Conference on Neural Information Processing System, Long Beach, NY, December 4-9.
[112] Wolf, T., Debut, L., Sanh, V., Chaumond, J., Delangue, C., Moi, A., Cistac, P., Rault, T., Louf, R., Funtowicz, M., Davison, J., Shleifer, S., von Platen, P., Ma, C., Jernite, Y., Plu, J., Xu, C., Scao, T. L., Gugger, S., Drame, M., Lhoest, Q., and Rush, A. M., 2020, "Transformers: State-of-the-Art Natural Language Processing," Proceedings of the 2020 Conference on Empirical Methods in Natural Language Processing: System Demonstrations, Association for Computational Linguistics, Virtually, November 16-20, pp. 38-45.
[113] Hori, C., Hori, T., Lee, T.-Y., Zhang, Z., Harsham, B., Hershey, J. R., Marks, T. K., and Sumi, K., 2017, "Attention-Based Multimodal Fusion for Video Description," Proceedings of the IEEE International Conference on Computer Vision, Venice, Italy, October 22-29, pp. 4193-4202.
[114] Kerroumi, M., Sayem, O., and Shabou, A., 2021, "Visualwordgrid: Information Extraction From Scanned Documents Using a Multimodal Approach," ICDAR Workshops 2021, Lausanne, Switzerland, September 5-7.
[115] McLachlan, G. J., Do, K.-A., and Ambroise, C., 2004, Analyzing Microarray Gene Expression Data, Wiley, Hoboken, NJ.
[116] Paszke, A., Gross, S., Massa, F., Lerer, A., Bradbury, J., Chanan, G., Killeen, T., Lin, Z., Gimelshein, N., and Antiga, L., 2019, "Pytorch: An Imperative Style, High-Performance Deep Learning Library," Conference on Neural Information Processing Systems, Vancouver, Canada, December 8-14.
[117] Kingma, D. P., and Ba, J., 2015, "Adam: A Method for Stochastic Optimization," International Conference for Learning Representations, San Diego, CA, May 7-9.
[118] Oh, S., Jung, Y., Kim, S., Lee, I., and Kang, N., 2019, "Deep Generative Design: Integration of Topology Optimization and Generative Models," ASME J. Mech. Des., 141(11), p. 111405.
[119] Shu, D., Cunningham, J., Stump, G., Miller, S. W., Yukish, M. A., Simpson, T. W., and Tucker, C. S., 2020, "3d Design Using Generative Adversarial Networks and Physics-Based Validation," ASME J. Mech. Des., 142(7), p. 071701.
[120] Zhang, Z., Liu, L., Wei, W., Tao, F., Li, T., and Liu, A., 2017, "A Systematic Function Recommendation Process for Data-Driven Product and Service Design," ASME J. Mech. Des., 139(11), p. 111404.
[121] Goodfellow, I. J., Pouget-Abadie, J., Mirza, M., Xu, B., Warde-Farley, D., Ozair, S., Courville, A., and Bengio, Y., 2014, "Generative Adversarial Nets," Proceedings of the 27th International Conference on Neural Information Processing Systems, Montreal, Canada, December 8-13.
[122] Yang, Z., Li, X., Catherine Brinson, L., Choudhary, A. N., Chen, W., and Agrawal, A., 2018, "Microstructural Materials Design Via Deep Adversarial Learning Methodology," ASME J. Mech. Des., 140(11), p. 111416.
[123] Vasconcelos, L. A., Cardoso, C. C., Saaksjarvi, M., Chen, C. C., and Crilly, N., 2017. "Inspiration and fixation: the influences of example designs and system properties in idea generation". Journal of Mechanical Design, 139(3).
[124] Ha, D., and Eck, D., 2017. "A neural representation of sketch drawings". arXiv preprint arXiv:1704.03477.
[125] Burnap, A., Liu, Y., Pan, Y., Lee, H., Gonzalez, R., and Papalambros, P. Y., 2016. "Estimating and exploring the product form design space using deep generative models". In International Design Engineering Technical Conferences and Computers and Information in Engineering Conference, Vol. 50107, American Society of Mechanical Engineers, p. V02AT03A013.
[126] Shu, D., Cunningham, J., Stump, G., Miller, S. W., Yukish, M. A., Simpson, T. W., and Tucker, C. S., 2020. "3d design using generative adversarial networks and physics-based validation". Journal of Mechanical Design, 142(7), p. 071701.
[127] Oh, S., Jung, Y., Kim, S., Lee, I., and Kang, N., 2019. "Deep generative design: Integration of topology optimization and generative models". Journal of Mechanical Design, 141(11).
[128] Goodfellow, I., Pouget-Abadie, J., Mirza, M., Xu, B., Warde-Farley, D., Ozair, S., Courville, A., and Bengio, Y., 2014. "Generative adversarial nets". In Advances in neural information processing systems, pp. 2672-2680.
[129] Yang, Z., Li, X., Catherine Brinson, L., Choudhary, A. N., Chen, W., and Agrawal, A., 2018. "Microstructural materials design via deep adversarial learning methodology". Journal of Mechanical Design, 140(11).
[130] Dow, S. P., Glassco, A., Kass, J., Schwarz, M., Schwartz, D. L., and Klemmer, S. R., 2010. "Parallel prototyping leads to better design results, more divergence, and increased self-efficacy". ACM Transactions on Computer-Human Interaction (TOCHI), 17(4), pp. 1-24.

[131] Teng, L., Fu, Z., and Yao, Y., 2020. "Interactive translation in echocardiography training system with enhanced cyclegan". IEEE Access, 8, pp. 106147-106156.
[132] Karras, T., Laine, S., and Aila, T., 2019. "A style-based generator architecture for generative adversarial networks". In Proceedings of the IEEE/CVF conference on computer vision and pattern recognition, pp. 4401-4410.
[133] Chen, L., Maddox, R. K., Duan, Z., and Xu, C., 2019. "Hierarchical cross-modal talking face generation with dynamic pixel-wise loss". In Proceedings of the IEEE Conference on Computer Vision and Pattern Recognition, pp. 7832-7841.
[134] Reed, S., Akata, Z., Yan, X., Logeswaran, L., Schiele, B., and Lee, H., 2016. "Generative adversarial text to image synthesis". arXiv preprint arXiv:1605.05396.
[135] Kim, T., Cha, M., Kim, H., Lee, J. K., and Kim, J., 2017. "Learning to discover cross-domain relations with generative adversarial networks". In International conference on machine learning, PMLR, pp. 1857-1865.
[136] Karras, T., Laine, S., Aittala, M., Hellsten, J., Lehtinen, J., and Aila, T., 2020. "Analyzing and improving the image quality of stylegan". In Proceedings of the IEEE/CVF conference on computer vision and pattern recognition, pp. 8110-8119.
[137] Shah, J. J., Smith, S. M., and Vargas-Hernandez, N., 2003. "Metrics for measuring ideation effectiveness". Design studies, 24(2), pp. 111-134.
[138] Sarkar, P., and Chakrabarti, A., 2011. "Assessing design creativity". Design studies, 32(4), pp. 348-383.
[139] Toh, C. A., Miller, S. R., and Okudan Kremer, G. E., 2014. "The impact of team-based product dissection on design novelty". Journal of Mechanical Design, 136(4), p. 041004.
[140] Yuan, C., and Moghaddam, M., 2020. "Attribute-aware generative design with generative adversarial networks". IEEE Access, 8, pp. 190710-190721.
[141] Lin, Y., Ren, P., Chen, Z., Ren, Z., Ma, J., and de Rijke, M., 2018. "Explainable fashion recommendation with joint outfit matching and comment generation". arXiv preprint arXiv:1806.08977, 2.
[142] Simo-Serra, E., Fidler, S., Moreno-Noguer, F., and Urtasun, R., 2015. "Neuroaesthetics in fashion: Modeling the perception of fashionability". In Proceedings of the IEEE Conference on Computer Vision and Pattern Recognition, pp. 869-877.
[143] Liang, X., Lin, L., Yang, W., Luo, P., Huang, J., and Yan, S., 2016. "Clothes co-parsing via joint image segmentation and labeling with application to clothing retrieval". IEEE Transactions on Multimedia, 18(6), pp. 1175-1186.
[144] Zhu, S., Urtasun, R., Fidler, S., Lin, D., and Change Loy, C., 2017. "Be your own prada: Fashion synthesis with structural coherence". In Proceedings of the IEEE international conference on computer vision, pp. 1680-1688.
[155] Wang, Z., She, Q., and Ward, T. E., 2021. "Generative adversarial networks in computer vision: A survey and taxonomy". ACM Computing Surveys (CSUR), 54(2), pp. 1-38.
[156] Salimans, T., Goodfellow, I., Zaremba, W., Cheung, V., Radford, A., and Chen, X., 2016. "Improved techniques for training gans". Advances in neural information processing systems, 29.
[157] Kelkar, V. A., and Anastasio, M., 2021. "Prior image-constrained reconstruction using style-based generative models". In International Conference on Machine Learning, PMLR, pp. 5367-5377.
[158] Hong, S., Marinescu, R., Dalca, A. V., Bonkhoff, A. K., Bretzner, M., Rost, N. S., and Golland, P., 2021. "3d-stylegan: A style-based generative adversarial network for generative modeling of three-dimensional medical images". In Deep Generative Models, and Data Augmentation, Labelling, and Imperfections. Springer, pp. 24-34.
[159] Paszke, A., Gross, S., Massa, F., Lerer, A., Bradbury, J., Chanan, G., Killeen, T., Lin, Z., Gimelshein, N., Antiga, L., et al., 2019. "Pytorch: An imperative style, high-performance deep learning library". Advances in neural information processing systems, 32.
[160] Heusel, M., Ramsauer, H., Unterthiner, T., Nessler, B., and Hochreiter, S., 2017. "Gans trained by a two time-scale update rule converge to a local nash equilibrium". Advances in neural information processing systems, 30.
[161] Harkonen, E., Hertzmann, A., Lehtinen, J., and Paris, S., 2020. "Ganspace: Discovering interpretable gan controls". Advances in Neural Information Processing Systems, 33, pp. 9841-9850.
[162] Wu, Z., Lischinski, D., and Shechtman, E., 2021. "Stylespace analysis: Disentangled controls for stylegan image generation". In Proceedings of the IEEE/CVF Conference on Computer Vision and Pattern Recognition, pp. 12863-12872.
[163] Heyrani Nobari, A., Rashad, M. F., and Ahmed, F., 2021. "Creativegan: Editing generative adversarial networks for creative design synthesis". In International Design Engineering Technical Conferences and Computers and Information in Engineering Conference, Vol. 85383, American Society of Mechanical Engineers, p. V03AT03A002.
[164] Gurumurthy, S., Kiran Sarvadevabhatla, R., and Venkatesh Babu, R., 2017. "Deligan: Generative adversarial networks for diverse and limited data". In Proceedings of the IEEE conference on computer vision and pattern recognition, pp. 166-174.
[165] Borji, A., 2019. "Pros and cons of gan evaluation measures". Computer Vision and Image Understanding, 179, pp. 41-65.
[166] Yang, D., Hong, S., Jang, Y., Zhao, T., and Lee, H., 2019. "Diversity-sensitive conditional generative adversarial networks". arXiv preprint arXiv:1901.09024.
[167] Yuan, C., Marion, T., and Moghaddam, M., 2022. "Leveraging end user data for enhanced design concept evaluation: A multimodal deep regression model". Journal of Mechanical Design, 144(2).

The invention claimed is:

1. A computer-implemented method of predicting customer sentiment for a product and aspects thereof, comprising the steps of:

receiving customer data for a plurality of products, and generating a vector of customer sentiments associated with different aspects of each of the plurality of products based on the customer data;

receiving images for each of the plurality of products, and generating a latent vector for the images for each product by fine-tuning a pre-trained image processing model;

receiving a textual description for each of the plurality of products, and generating a latent vector for the textual description for each product by fine-tuning a pre-trained natural language processing model;

applying a deep multimodal design evaluation (DMDE) model with a self-attention fusion mechanism to capture single modality features of the latent vectors and integrate the latent vectors of the images and the textual descriptions for each product to predict customer sentiment for new product designs based on their images and textual descriptions, wherein the latent vectors are integrated by the self-attention fusion mechanism using naïve concatenation and projecting the latent vectors onto a set of subspaces; and providing a new product design comprising one or more orthographic renderings to the DMDE model to predict customer sentiments for one or more attributes of the new product design, and a second new product design having one or more attributes having favorable predicted customer sentiments using the DMDE model and a generative design model, based solely on the one or more orthographic renderings.

2. The method of claim 1, wherein the customer data comprises customer reviews or customer survey results.

3. The method of claim 2, wherein the customer reviews comprise online reviews posted by customers scraped from online sources.

4. The method of claim 1, wherein generating the latent vector for the images comprises, for the customer data for each product, identifying the attributes of the product discussed in the customer data, identifying the sentiments expressed for each attribute of the product, and identifying an intensity and polarity of each sentiment.

5. The method of claim 4, wherein generating the latent vector for the images further comprises aggregating customer sentiments identified for each product.

6. The method of claim 1, further comprising combining the latent vector for the textual description for each product and the latent vector for the images for each product prior to designing the DMDE model using a multimodal data concatenation process.

7. The method of claim 1, wherein the DMDE model and the generative design model comprise neural network models.

8. The method of claim 1, wherein the images comprise multiple different views of each of the plurality of products.

9. A computer program product for predicting customer sentiment for a product and aspects thereof, the computer program product comprising a computer readable storage medium having program instructions embodied therewith, the program instructions executable by a processor to cause the processor to perform a method comprising:

receiving customer data for a plurality of products, and generating a vector of customer sentiments associated with different aspects of each of the plurality of products based on the customer data;

receiving images for each of the plurality of products, and generating a latent vector for the images for each product by fine-tuning a pre-trained image processing model;

receiving a textual description for each of the plurality of products, and generating a latent vector for the textual description for each product by fine-tuning a pre-trained natural language processing model;

applying a deep multimodal design evaluation (DMDE) model with a self-attention fusion mechanism to capture single modality features of the latent vectors and integrate the latent vectors of the images and the textual descriptions for each product to predict customer sentiment for new product designs based on their images and textual descriptions, wherein the latent vectors are integrated by the self-attention fusion mechanism using naïve concatenation and projecting the latent vectors onto a set of subspaces; and providing a new product design comprising one or more orthographic renderings to the DMDE model to predict customer sentiments for one or more attributes of the new product design and a second new product design having one or more attributes having favorable predicted customer sentiments using the DMDE model and a generative design model, based solely on the one or more orthographic renderings.

10. The computer program product of claim 9, wherein the customer data comprises customer reviews or customer survey results.

11. The computer program product of claim 10, wherein the customer reviews comprise online reviews posted by customers scraped from online sources.

12. The computer program product of claim 9, wherein generating the latent vector for the images comprises, for the customer data for each product, identifying the attributes of the product discussed in the customer data, identifying the sentiments expressed for each attribute of the product, and identifying an intensity and polarity of each sentiment.

13. The computer program product of claim 12, wherein generating the latent vector for the images further comprises aggregating customer sentiments identified for each product.

14. The computer program product of claim 9, wherein the method further comprises combining the latent vector for the textual description for each product and the latent vector for the images for each product prior to designing the DMDE model using a multimodal data concatenation process.

15. The computer program product of claim 9, wherein the DMDE model and the generative design model comprise neural network models.

16. The computer program product of claim 9, wherein the images comprise multiple different views of each of the plurality of products.

17. A computer system, comprising:

at least one processor;

memory associated with the at least one processor; and a program stored in the memory for predicting customer sentiment for a product and aspects thereof, the program containing a plurality of instructions which, when executed by the at least one processor, cause the at least one processor to:

receive customer data for a plurality of products, and generate a vector of customer sentiments associated with different aspects of each of the plurality of products based on the customer data;

receive images for each of the plurality of products, and generate a latent vector for the images for each product by fine-tuning a pre-trained image processing model;

receive a textual description for each of the plurality of products, and generate a latent vector for the textual description for each product by fine-tuning a pre-trained natural language processing model;

apply a deep multimodal design evaluation (DMDE) model with a self-attention fusion mechanism to capture single modality features of the latent vectors and integrate the latent vectors of the images and the textual descriptions for each product to predict customer sentiment for new product designs based on their images and textual descriptions, wherein the latent vectors are integrated by the self-attention fusion mechanism using naïve concatenation and projecting the latent vectors onto a set of subspaces; and provide a new product design comprising one or more orthographic renderings to the DMDE model to predict customer sentiments for one or more attributes of the new product design and a second new product design having one or more attributes having favorable predicted customer sentiments using the DMDE model and a generative design model.

18. The computer system of claim 17, wherein the customer data comprises customer reviews or customer survey results.

19. The computer system of claim 18, wherein the customer reviews comprise online reviews posted by customers scraped from online sources.

20. The computer system of claim 17, wherein generating the latent vector for the images comprises, for the customer data for each product, identifying the attributes of the product discussed in the customer data, identifying the sentiments expressed for each attribute of the product, and identifying an intensity and polarity of each sentiment.

* * * * *